US010387337B2

(12) United States Patent
Shaw et al.

(10) Patent No.: US 10,387,337 B2
(45) Date of Patent: *Aug. 20, 2019

(54) PORTABLE STORAGE DEVICE WITH CHARGE RESERVOIR FOR HIGHER CURRENT OPERATIONS

(71) Applicant: Seagate Technology LLC, Cupertino, CA (US)

(72) Inventors: John Wayne Shaw, Frederick, CO (US); Robert John Dore, Thornton, CO (US); Christopher A. Massarotti, Berthoud, CO (US); Philip Jurey, Longmont, CO (US); Ashutosh Razdan, San Jose, CA (US); Philip Yin, Fremont, CA (US); Michael Gene Morgan, Los Altos Hills, CA (US)

(73) Assignee: Seagate Technology LLC, Cupertino, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 15/399,641

(22) Filed: Jan. 5, 2017

(65) Prior Publication Data
US 2017/0192476 A1 Jul. 6, 2017

Related U.S. Application Data

(60) Provisional application No. 62/275,072, filed on Jan. 5, 2016.

(51) Int. Cl.
*G06F 13/16* (2006.01)
*G06F 13/38* (2006.01)
(Continued)

(52) U.S. Cl.
CPC .............. *G06F 13/16* (2013.01); *G06F 1/263* (2013.01); *G06F 3/0602* (2013.01);
(Continued)

(58) Field of Classification Search
CPC ...... G06F 13/16; G06F 13/382; G06F 13/385; G06F 13/4022; G06F 13/4282;
(Continued)

(56) References Cited

U.S. PATENT DOCUMENTS 6,320,278 B1 11/2001 Nishiyama et al.
7,114,085 B1 9/2006 Kim
(Continued)

*Primary Examiner* — Terrell S Johnson

(57) ABSTRACT

An apparatus includes a communication interface, a controller, and a power section. The communication interface is configured to receive power from an external host to the apparatus. The controller is configured to limit a current drawn by the communication interface to a predetermined value when the apparatus is powered through the external host. The power section is configured to generate a first voltage from a portion of the limited current drawn by the communication interface. The first voltage powers a data storage circuitry. The power section is further configured to store electrical charges received from another portion of the limited current drawn by the communication interface. The power section is further configured to generate a second voltage from the stored electrical charges in response to a signal from the controller. The second voltage supplements the first voltage during high power events by the data storage circuitry.

20 Claims, 11 Drawing Sheets

(51) Int. Cl.
*G06F 13/40* (2006.01)
*G06F 13/42* (2006.01)
*G06F 1/26* (2006.01)
*G06F 3/06* (2006.01)

(52) U.S. Cl.
CPC .......... *G06F 13/382* (2013.01); *G06F 13/385* (2013.01); *G06F 13/4022* (2013.01); *G06F 13/4282* (2013.01); *G06F 2213/0032* (2013.01); *G06F 2213/0042* (2013.01)

(58) Field of Classification Search
CPC ............. G06F 1/263; G06F 2213/0032; G06F 2213/0042; G06F 3/0602
See application file for complete search history.

(56) References Cited

U.S. PATENT DOCUMENTS

| | | |
|---|---|---|
| 7,203,777 B2 | 4/2007 | Morita et al. |
| 7,332,832 B2 | 2/2008 | Rowan |
| 7,761,647 B2 | 7/2010 | Yang |
| 7,782,022 B2 | 8/2010 | Xu et al. |
| 7,783,802 B1 | 8/2010 | Nemazie et al. |
| 8,049,462 B2 | 11/2011 | Kung et al. |
| 8,122,267 B2 | 2/2012 | Rui et al. |
| 8,582,227 B2 | 11/2013 | Krishnamoorthy et al. |
| 2010/0146333 A1* | 6/2010 | Yong ...................... G06F 1/305 714/14 |
| 2010/0332859 A1* | 12/2010 | Trantham .................. G06F 1/26 713/300 |
| 2010/0332860 A1* | 12/2010 | Trantham ................ G06F 1/263 713/300 |
| 2011/0066872 A1* | 3/2011 | Miller ....................... G06F 1/30 713/340 |
| 2013/0290742 A1 | 10/2013 | Lin et al. |
| 2014/0306529 A1 | 10/2014 | Yin et al. |
| 2014/0320091 A1 | 10/2014 | Kung |
| 2016/0071609 A1* | 3/2016 | Lucas .................... G11C 16/30 365/185.18 |
| 2018/0113497 A1* | 4/2018 | Massarotti ................ G06F 3/06 |

* cited by examiner

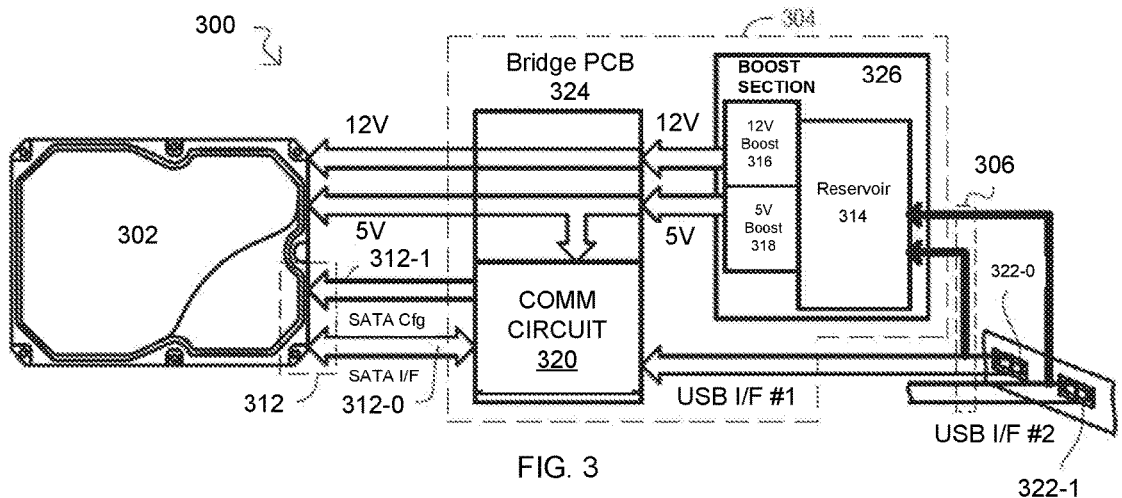
FIG. 3
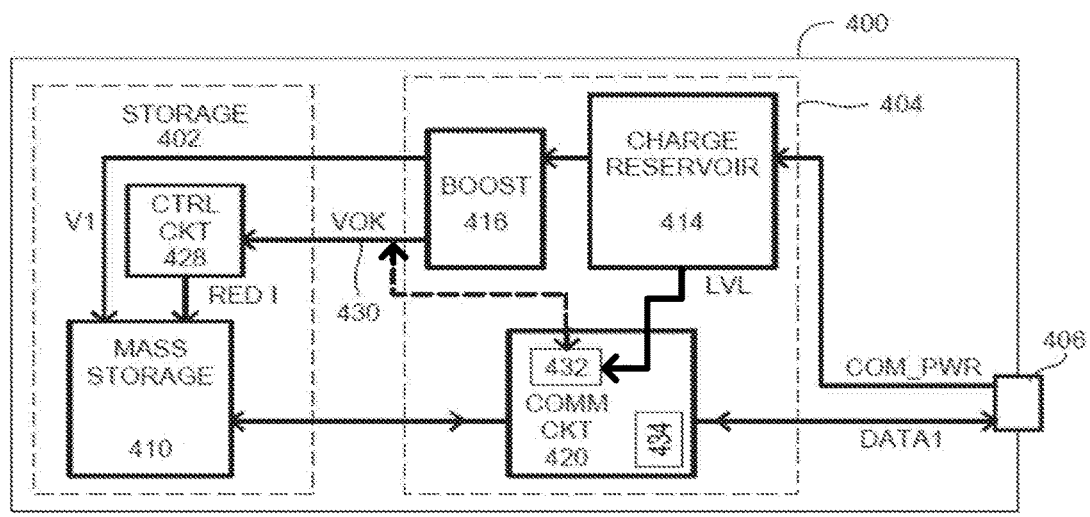
FIG. 4
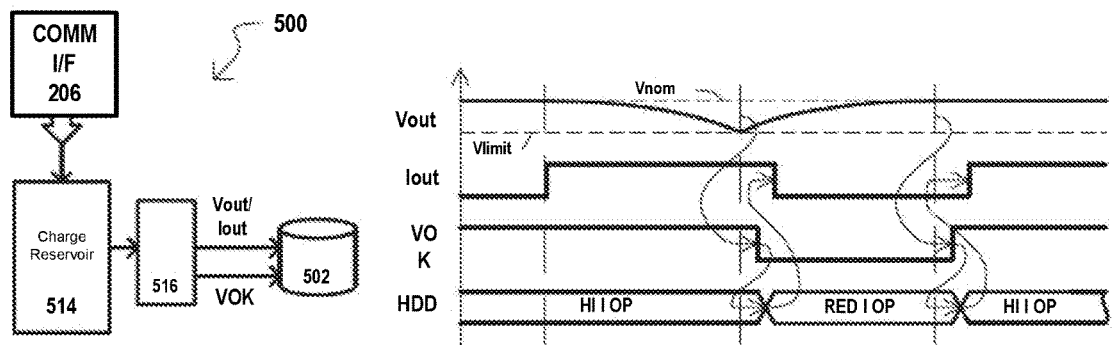
FIG. 5A
FIG. 5B

PORTABLE STORAGE DEVICE WITH CHARGE RESERVOIR FOR HIGHER CURRENT OPERATIONS

The instant application claims the benefit and priority to the U.S. Provisional Patent Application No. 62/275,072 filed on Jan. 5, 2016, which is incorporated herein by reference in its entirety.

BACKGROUND

Some electronic devices may have operations that require an increase in power supply current. For example, conventional portable hard disk drives (HDD) can have operations that require an increase in power supply current, such as spin-up (rotational acceleration up to an operational speed) and seek (moving an actuator or equivalent structure to a desired data storage location), as but two examples. Consequently, portable HDDs can require an external power supply (i.e., a power "brick") to ensure that an adequate current supply is available for all type of operations.

A drawback to requiring external power supplies for an electronic device, e.g., portable HDD, can be the cost involved in manufacturing and packing such accessories. In addition, to ensure use at different locations, a user must transport the power supply, adding to the bulk and weight of what has to be carried.

SUMMARY

Provided herein is an apparatus including a communication interface, a controller, and a power section. The communication interface is configured to receive power from an external host to the apparatus. The controller is configured to limit a current drawn by the communication interface to a predetermined value when the apparatus is powered through the external host. The power section is configured to generate a first voltage from a portion of the limited current drawn by the communication interface. The first voltage powers a data storage circuitry. The power section is further configured to store electrical charges received from another portion of the limited current drawn by the communication interface. The power section is further configured to generate a second voltage from the stored electrical charges in response to a signal from the controller. The second voltage supplements the first voltage during high power events by the data storage circuitry. These and other features and advantages will be apparent from a reading of the following detailed description.

BRIEF DESCRIPTION OF DRAWINGS

FIG. 3 shows a block diagram of a portable hard disk device according to one aspect of the present embodiments.

FIG. 4 shows another storage device according to one aspect of the present embodiments.

FIGS. 5A-5B show a diagrammatic representation of an operation for a storage device and a timing diagram thereof that changes its operation responsive to availability of power according to an aspect of the present embodiments.

DESCRIPTION

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Figure 1A:
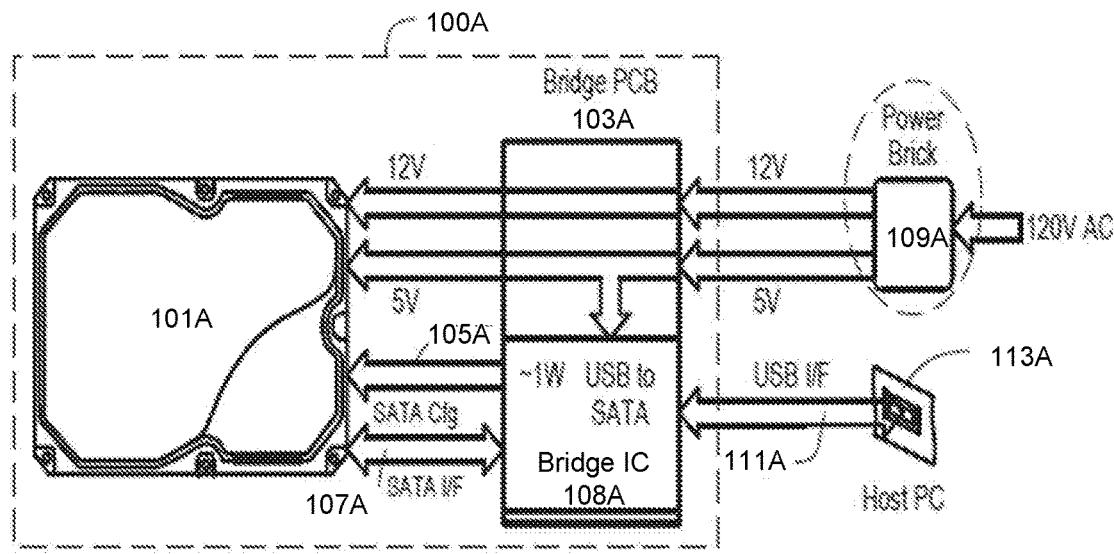
FIG. 1A shows a portable hard disk drive.

Referring now to FIG. 1A, a portable hard disk drive (HDD) is shown. Portable HDD 100A can include a hard disk section 101A and a bridge printed circuit board (PCB) 103A. A hard disk section 101A includes the storage medium and accompanying mechanical and electrical components. In the example shown, a hard disk section 101A receives power from an external power supply, e.g., power brick 109A that includes a twelve volt power supply (12V) and a five volt power source (5V) power supply, through the bridge PCB 103A. In addition, hard disk section 101A receives SATA configuration data 105A from the bridge PCB 103A. It is appreciated that the hard disk section 101A may include a SATA interface (I/F) 107A to communicate to the bridge PCB 103A.

The bridge PCB 103A may include a USB-to-SATA bridge integrated circuit (IC) 108A. The bridge PCB 103A can receive 12V from an external power supply (e.g., power brick) 109A and can receive, or derive 5V from, the external power supply 109A. Furthermore, the bridge PCB 103A may serve as a source of power for the 12V and 5V power supply to the hard disk section 101A. In some embodiments, the 5V power supply from the external power supply may power the USB-to-SATA bridge IC 108A. The bridge PCB 103A may include a USB I/F 111A, which can connect to a host device 113A, such as a host personal computer (PC). It is appreciated that the USB I/F 111A can provide a serial data path and can include its own I/F power supply.

External power supply 109A generates a sufficiently strong 12V power supply, particularly for high current load operations of the hard disk section 101A, such as spin-up and seek. Power supply 109A may be a AC-DC converter, converting a high voltage AC source (120 VAC) to a 12 VDC supply (and optionally also a 5 VDC supply in rare cases). However, the USB I/F 111A that establishes connection between the portable HDD 100A and the host device 113A generally does not provide sufficient power for all operations of the hard disk section 101A.

Figure 1B:
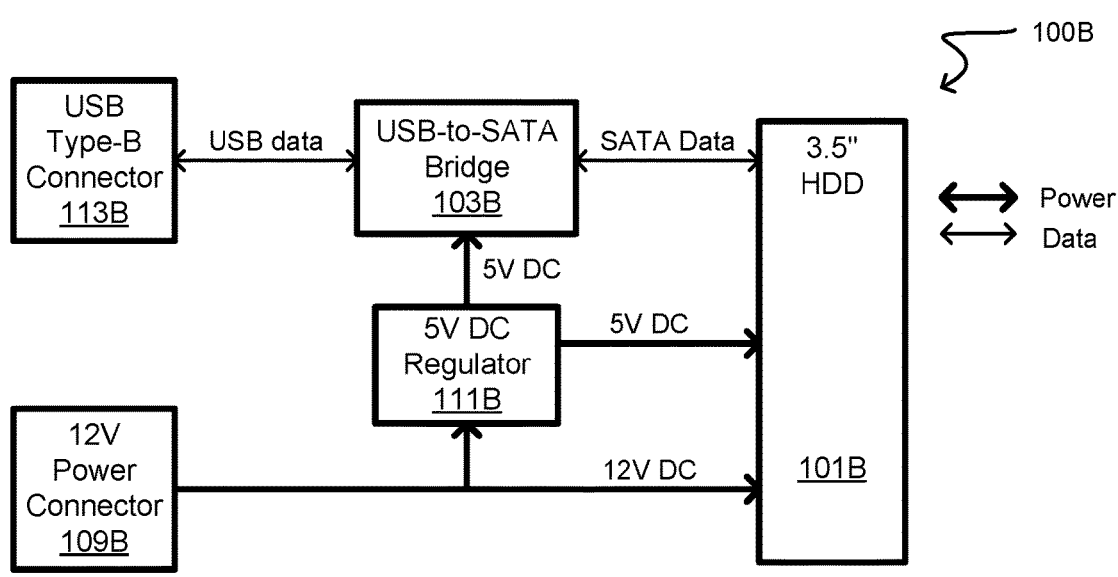
FIG. 1B shows a block diagram of a portable hard disk drive.

Referring now to FIG. 1B, a block diagram of another portable HDD is shown. Device 100B can be connected to a host device (not shown) by a USB Type-B connector 113B. Device 100B may receive 12V DC power via an external power connector 109B. Data and control signals (USB Data) received via the USB connector 113B can be translated into SATA compatible signals via a USB-to-SATA bridge circuit 103B. Power received from power connector 109B (12V) can be provided to a 3.5 inch hard disk section 101B. The same power (12V) can be converted to a lower voltage (5V DC) by a regulator circuit 111B, and provide such lower voltage power to the bridge circuit 103B and hard disk section 101B. It is appreciated that the bridge circuit 103B may operate substantially similar to the USB-to-SATA bridge IC 108A of FIG. 1A.

To ensure sufficient power for a portable HDD device, conventional approaches have utilized an external power supply. Some versions of the USB protocol do provide for negotiated power delivery. However, the limits of such power delivery can vary according to the capabilities of a host (e.g., computing or other electronic device). Thus, while an external device, such as a portable HDD could negotiate for enough power from a single USB connection for one host, the same power may not be available from another host. Accordingly, a portable HDD device capable of negotiating for higher host power would only be compatible with certain host devices.

Embodiments can include devices and methods for operating electronic devices, e.g., a portable storage device, with a charge reservoir for providing sufficient power during higher current events. A portable storage device can receive power from a lower power source, such as a communications interface. A charge reservoir can be charged with the lower power source and the charge reservoir may be used to provide a higher power, boosted voltage for higher current operations of the storage device, during peak power events.

In some embodiments, a charge reservoir has sufficient power to cover all higher current events. As such, electronic devices, e.g., the storage device, using charge reservoir can operate in an uninterrupted fashion during high peak power events despite using a low power source.

In other embodiments, higher current operations can eventually exhaust a charge reservoir. In such events, a signal can be activated indicating that a power source of the charge reservoir is low. In response to the activated signal, the electronic device, e.g., a storage device, can suspend high current operations until the charge reservoir is replenished.

In further embodiments, different voltages, e.g., two different voltages, can be generated, all or in part, using a charge reservoir. A higher of the voltages can serve as a power supply for a mass storage section, while a lower of the voltages can power a communications circuit. The communications circuit can translate requests from one communication protocol into another communications protocol.

In particular embodiments, a storage device can be a portable hard disk drive, which can receive power from one or more serial data communication interfaces (I/Fs) including but not limited to universal serial bus (USB) type I/Fs.

In the described embodiments, like items are referred to by the same reference characters, but with the leading digit(s) corresponding to the figure number.

Figure 1C:
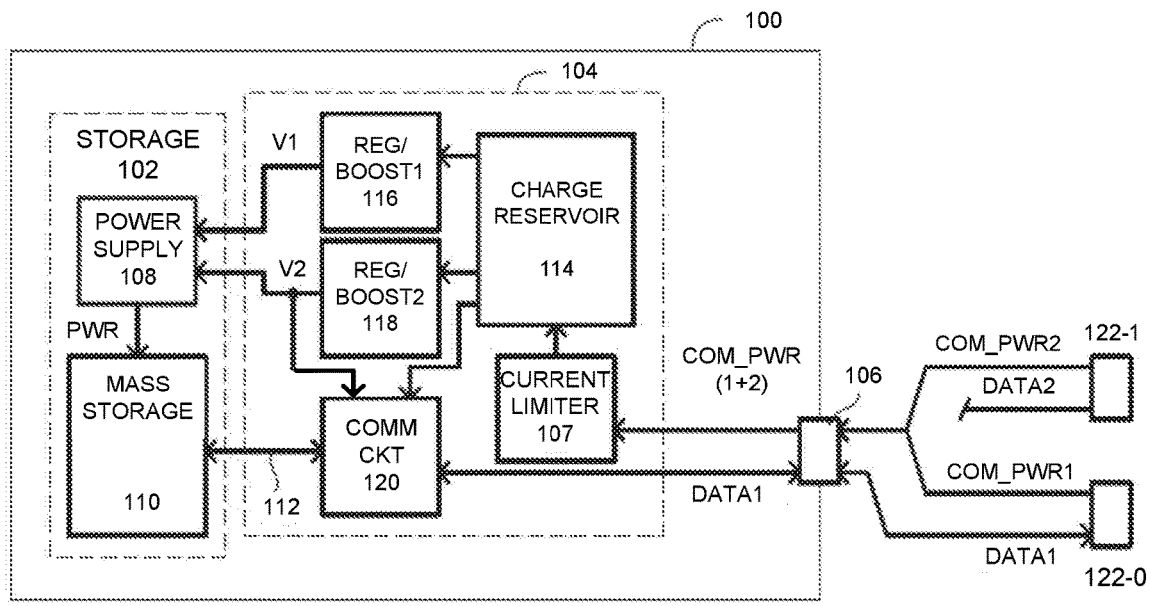
FIG. 1C shows a device being powered by only external communication interface according to one aspect of the present embodiments.

Referring now to FIG. 1C a device 100 according to one aspect of present embodiments is shown. In some embodiments, a device 100 can be a portable storage device that enables access to a large amount of storage over one or more powered interfaces without the need for an external power supply. Device 100 may include a storage section 102, a power supply and control section 104, and one or more communication interfaces (I/F) (one shown as 106).

The storage section 102 can include a storage power supply 108 and a mass storage 110. The storage power supply 108 receives a first voltage V1, and in some embodiments a second voltage V2, from the power supply and control section 104. In response to voltage(s) V1 (and/or V2), the storage power supply 108 powers (PWR) to mass storage 110. In some embodiments, a first voltage V1 can be greater than 5V, or greater than 10V, and in particular embodiments about 12V. A second voltage V2 can be equal to or less than about 5V.

The mass storage 110 is powered by the storage power supply 108. It is appreciated that the mass storage 110 includes a storage media and corresponding circuits and devices for accessing data according to signals received over a storage I/F 112. In operation, mass storage 110 can have events with different current draws, including higher current events and lower current events. In some embodiments, mass storage 110 can be a hard disk drive (HDD), however, alternate embodiments can include different kinds of storage media. In HDD embodiments, higher current events can include spin-up and seek operations. In some embodiments, the I/F 112 can be a serial AT attachment (SATA) compatible interface. However, it is appreciated that the description of the embodiments with respect to HDD and SATA interface are for illustrative purposes and should not be construed as limiting the scope of the embodiments. For example, in other embodiments other types of interfaces suitable for the particular mass storage may be employed.

In some embodiments, the power supply and control section 104 is powered by one or more communication I/Fs (e.g., 106). It is appreciated that the power supply and control section 104 may convert the received power from the one or more communication I/Fs 106 and generate the first and second voltages (V1 and V2). That is, voltages V1 and V2 are not generated with the aid of dedicated power supply (e.g., power brick). In some embodiments, the entire power needs of the device 100 is received from one or more communication I/Fs (e.g., 106). It is appreciated that converting the received power from the one or more communication I/F 106 to the first and the second voltages is exemplary and should not be construed as limiting the scope of the embodiments. For example, the power supply and control section 104 may convert the received power to three different voltages.

The power supply and control section 104 can include a current limiter 107, a charge reservoir 114, a first boost circuit 116, a second boost circuit 118, and a communications circuit 120. In some embodiments, the current limiter 107 receives power from communications I/F(s) (e.g., 106). The current limited 107 may then output a current-limited/power-limited copy to the charge reservoir 114, thereby charging the charge reservoir 114 by storing electrical charges therein. It is appreciated that the stored electrical charges in the charge reservoir 114 may subsequently be used by the first boost circuit 116 and optionally the second boost circuit 118 at different peak power events.

In some embodiments, the charge reservoir 114 can include any suitable charge storage structure, including but not limited to one or more rechargeable (secondary) batteries, capacitors (including "super" capacitors), or any combination thereof. It is appreciated that the charge reservoir 114 may supplement the power supplied to the storage section 102 via the first boost circuit 116, the second boost circuit 118, or any combination thereof. In operation, the charge reservoir 114 may periodically be depleted by transient higher current events resulting from power draw by the mass storage 110 (and thus storage power supply 108, the first boost circuit 116, the second boost circuit 118) that exceed an output of current limiter 107. In some embodiments the level of depletion for the charge reservoir 114 can be monitored directly or indirectly. For example, the level of depletion associated with the chare reservoir 114 can be monitored by the communications circuit 120. In some embodiments, the communications circuit 120 may flag the mass storage 110 to indicate when a level of stored charges at the charge reservoir 114 has reached a predetermined critical level. However, after such transient events are over, the charge storage of the charge reservoir 114 can be replenished via the communications I/F(s) (e.g., 106) through the current limiter 107.

The first boost circuit 116 can boost the received voltage, e.g., the magnitude of the received voltage from the one or more communications I/F 106, to generate the first voltage V1. The first boost circuit 116 can receive power from charge reservoir 114 in a number of ways. In some embodiments, the first boost circuit 116 can have a direct connection to the charge reservoir 114 in order to generate the first voltage V1. Although not shown in this Figure, in other embodiments, the first boost circuit 116 can generate the first voltage V1 from power provided by one or more communication I/Fs (e.g., 106), and then can selectively draw from the charge reservoir 114 when greater current capacity is needed (e.g., higher current events for mass storage 110). In some embodiments, the first boost circuit 116 can include additional circuits, such as voltage regulator circuits, DC-to-DC conversion circuits, or any combination thereof, in order to generate the first voltage V1.

In some embodiments, the second boost circuit 118 can boost the received voltage, e.g., the magnitude and/or a current capacity of the received voltage from the one or more communications I/F 106, to generate the second voltage V2. Although not shown in this Figure, but similar to the first boost circuit 116, the second boost circuit 118 can have a direct connection to charge reservoir 114 in order to generate the second voltage V2, while in other embodiments the second boost circuit 118 can selectively draw from the charge reservoir 114 when greater current capacity is required, e.g., during peak power event such as spin up of HDD. In some embodiments, the second boost circuit 118 can include voltage regulators, converters, or any combination thereof.

Communication circuit 120 can translate data between serial data/commands of one protocol on communication I/F 106 to serial/data commands of another protocol on storage I/F 112. In the embodiment shown, communication circuit 120 is powered by the second voltage V2. In some embodiments, both communication I/Fs 106/112 can be serial data I/Fs. In particular embodiments, communication I/F 106 can be a Universal Serial Bus (USB) type interface. However, it is appreciated that the description of the embodiments with respect to the USB type interface is for illustrative purposes and is not intended to be construed as limiting the scope of the embodiments. In some embodiments, storage I/F 112 can be a hard disk compatible interface, such as a SATA interface, as but one example. Communication circuit 120 can also include a data communication path DATA1 to communicate to the I/F 106.

As noted above, device 100 is powered by one or more communication I/Fs, e.g., communications I/F 106. In some embodiments, while communication I/F 106 provides power to the charge reservoir 114 (and optionally directly to the first and the second boost circuits 116 or 118), the same communications I/F 106 can receive power from one or more other communication I/Fs. That is, the power provided by communication I/F 106 can the combined power from multiple other communication I/Fs. Referring still to FIG. 1C, in the particular embodiment shown, communication interface 106 can receive power from the first and the second external communication I/Fs 122-0/1, and can receive control/data values from only the first external communication I/F 122-0. In a particular embodiment, power from first and second external communication I/F 122-0/1 can be provided to the device 100 via a communication I/F 106 of the device 100 using a "vampire" cable that can conductively connect power from multiple external communication I/F (e.g., 122-0/1), while providing a data/control path for only one communication I/F 122-0. In some embodiments, external communication I/Fs 122-0/1 and a device communication I/F 106 can be USB type I/Fs. It is appreciated that providing control/data through one external communication, as described above, is for illustrative purposes only and should not be construed as limiting the scope of the embodiments.

It is understood that neither of external communication I/Fs 122-0/1 are power delivery type communication I/Fs that are designed to provide more power than that designated for the communication channel. For example, external communications I/Fs 122-0/1 may not be power delivery USB I/Fs which can provide a 20V supply (as opposed to a 5V or lower supply on standard USB I/Fs).

Having described various sections of a device 100, particular operations of device 100 will now be described. A communication I/F (e.g., 106) of device 100 can be connected to one or more external communication I/Fs 122-0/1, resulting in the charge reservoir 114 accumulating charges through power provided from the external communication I/Fs 122-0/1. The first and the second boost circuits 116/118 can generate power supply voltages V1/V2, respectively. The generated voltages may be supplied to storage power supply 108 of the storage section 102. Once sufficient charge has been accumulated, the device 100 can be ready for data storage operations.

Commands, data, or any combination thereof can be received at the communication I/F 106 external to the device 100 (e.g., an external communication I/F 122-0). Such commands can be translated from one protocol to another by the communication circuit 120 and driven on storage I/F 112 to the mass storage 110. In response to such commands/data, mass storage 110 can execute data access operations (e.g., reads/writes). In the event such operations are higher current operations, the first boost circuits 116, the second boost circuit 118, or any combination thereof can use the charges stored on the charge reservoir 114 to provide any additional current needed to perform the higher current operations. Once higher current operations have ceased, the charge reservoir 114 can be replenished from power provided at device communication I/F 106.

It is noted that while FIG. 1C shows a device with one communication I/F (i.e., 106), alternate embodiments can include devices with more than one communication I/F 106 that can receive power from the multiple I/Fs. Further, while the embodiment of FIG. 1C shows a device that receives power from a vampire cable connected to two external interfaces, alternate embodiment can receive power from a greater number of I/Fs, or but one I/F.

Figures 2A, 2B, 2C:
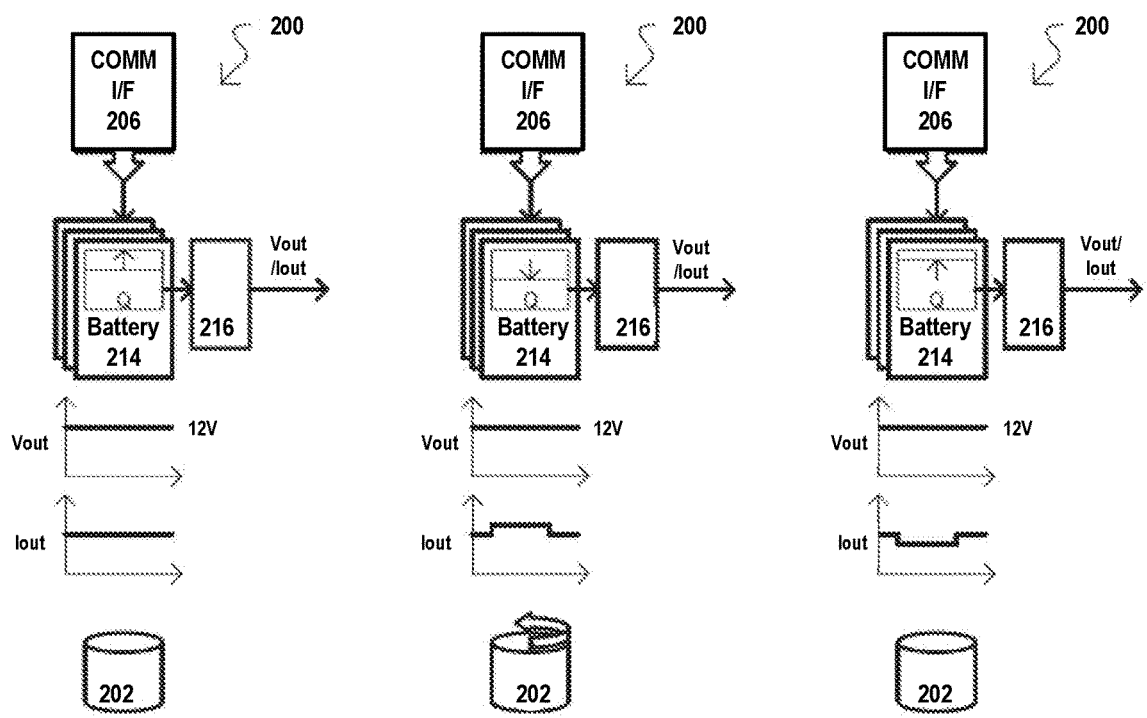
FIGS. 2A-2C show a device during three operational states in accordance with one aspect of the present embodiments.

Referring now to FIGS. 2A-2C, a device during three operational states in accordance with one aspect of the present embodiments is shown. Each of FIGS. 2A to 2C shows a device 200 that includes a communication I/F 206, a charge reservoir 214 (in this embodiment a battery), boost circuit 216, and a storage section 202 (in this embodiment a hard disk). FIGS. 2A-2C also include two graphs, one showing an output voltage from the boost circuit 216 (Vout) and the other showing a current draw (Iout) from the boost circuit 216. It is appreciated that the communication I/F 206 may be substantially similar to the communication I/F 106, the storage section 202 may be substantially similar to the storage 102, the charge reservoir 214 may be substantially similar to that of charge reservoir 114, and the boost circuit 216 may be substantially similar to that of the first and/or second boost circuit 116 and 118, FIG. 2A shows an initial state of device 200. Power from communication I/F 206 can be provided to battery 214, which can be charged to a certain level (represented by level "Q"). Typically, the communication I/F 206 does not provide sufficient power for certain high power events. A boost circuit 216 can provide power to hard disk 202 in the form of Vout and Iout. In the very particular embodiment shown, Vout can be nominally 12V. Boost circuit 216 can use the battery 214 to generate all of its output power, or to supplement such output power as needed.

FIG. 2B shows a state of device 200 when hard disk 202 undergoes a high current drawn operation. As a result, Iout can increase in level. However, the boost circuit 216 can rely on battery 214 to provide sufficient power to ensure a desired voltage level is maintained. However, such operations can drain battery 214 (as represented by level "Q" falling).

FIG. 2C shows a state of device 200 after hard disk 202 changes to a lower current drawn operation, following that of FIG. 2B. As shown, a level of Iout can decrease. However, such a reduction in power requirements enables the charges stored in the battery 214 to be replenished via power being supplied from communication I/F 206.

Referring now to FIG. 3, a block diagram of a portable hard disk device 300 according to one aspect of the present embodiments is shown. Device 300 can include a hard disk drive (HDD) assembly 302 and a power supply and control section 304. In some embodiments, the HDD assembly 302 receives two power supply voltages (12V and 5V) from power supply and control section 304. In addition, the HDD assembly 302 may be connected to the power supply and control section 304 via a storage I/F 312, which in the embodiment shown, can be a SATA I/F. However, any suitable communication I/F can be employed based on the HDD assembly 302 utilized. The HDD assembly 302 may include any suitable HDD, including HDD assemblies with one or more magnetic media storage platters with or without solid-state storage. HDD assemblies can have various sizes, including 2.5" HDDs or 1.8" HDD, but in particular embodiments can utilize HDD typically found in larger electronic devices, such as 3.5" HDD. As noted above, alternate embodiments may not include a magnetic storage medium.

The power supply and control section 304 may include a "bridge" section 324 and a boost section 326. In some embodiments, the bridge section 324 can provide two different voltages, hence two different power supplies to the HDD assembly 302. For example, the bridge section 324 may include both a 12V power supply and a 5V power supply. In some embodiments, bridge section 324 can serve as a conduit for power provided from boost section 326. However, in other embodiments, bridge section 324 can include circuits associated with providing a power supply, including but not limited to voltage regulator circuits. In the particular embodiment shown, power supply and control section 304 can provide a 12V power supply and a 5V power supply.

The bridge section 324 can also include a communication circuit 320, which can be powered from the second power supply (i.e., 5V). In some embodiments, the communication circuit 320 may be substantially similar to the communication circuit 120. In the embodiment of FIG. 3, the communication circuit 320 is a bridge integrated circuit (IC), which can translate between communications in a USB protocol, to and from external USB I/F 322-0, to those of a SATA protocol associated with the HDD assembly 302. Bridge IC 320 can be connected to HDD assembly 302 via storage I/F 312, which can be a SATA compatible I/F. In the embodiment shown, storage I/F 312 can include a SATA control/data path 312-0 which can provide a path for commands and bi-directional data, as well as a configuration input 312-1, which can provide configuration data to the HDD assembly 302. Bridge IC 320 can also be connected to communication I/F 306, which can be a USB compatible I/F. In the embodiment shown, communication I/F 306 can have a data command path from one external USB I/F 322-0 (i.e., an I/F external to device 300), but receive power from two external USB I/Fs (322-0/1). In some embodiments, a vampire type cable can be used to connect the external USB I/Fs 322-0/1 to device 300. In a particular embodiment, bridge section 324 can include a printed circuit board (PCB) on which bridge IC 320 is mounted.

A boost section 326 can include a charge reservoir 314, a first boost circuit 316 and a second boost circuit 318. A charge reservoir 314 can include any of those described herein, or equivalents, including but not limited to a battery, a capacitor, or combinations thereof and it is substantially similar to the charge reservoir 114 described above and the first and the second boost circuits 316 and 318 may be substantially similar to that of the first and the second boost circuits 116 and 118 described above. The charge reservoir 314 may receive charges from one or more external I/Fs. For example, in the embodiment shown, the charge reservoir 314 receives power from two, USB external I/Fs (322-0/1). The first boost circuit 316 can generate a first power supply voltage (i.e., 12V) from power received from one or more external I/F (322-0 and/or 322-1). The first power supply voltage (i.e., 12V) can be generated all, or in part, from the charge reservoir 314. In a similar fashion, the second boost circuit 318 can generate a second power supply voltage (i.e., 5V) from the power received from one or more external I/F (322-0 and/or 322-1). Second power supply voltage (i.e., 5V) can be generated all, or in part, from charge reservoir 314.

Device 300 may operate substantially similar to the embodiments of FIGS. 1C, and 2A-2C, as described herein. The charge reservoir 314 can accumulate charge. When the HDD assembly 302 undergoes high current draw operations (e.g., spin-up or seek), charge reservoir 314 can provide power above the power which is provided by an external I/F alone (e.g., 322-0 or 322-1). When high current draw operations cease, the charge reservoir 314 can begin to be recharged. It is understood the capacity of the charge reservoir 314 can be selected according to expected operations. In some embodiments, the charge reservoir 314 can be sufficient for any operations of the HDD assembly 302, thus there can be no interruptions in data accesses to the HDD assembly 302. However in other embodiments, as disclosed herein, accesses to a mass storage section (e.g., HDD 302) can be suspended or delayed in the event charge reservoir 314 becomes too depleted for an expected or actual high current operation.

Referring now to FIG. 4, another storage device according to one aspect of the present embodiments is shown. FIG. 4 includes elements similar to those of FIG. 1C, and such like items can operate in a same, similar or equivalent fashion. Device 400 differs from FIG. 1C in that it can generate a power indication signal to suspend or otherwise alter operations of a mass storage circuit 410 in the event that sufficient power cannot be provided and/or there is the possibility that sufficient power cannot be provided. It is appreciated that the power supply and control section 404, the charge reservoir 414, the boost circuit 416, the communication I/F 406, the storage 402, the communication circuit 420, and the mass storage 410 operate substantially similar to the power supply and control section 104, the charge reservoir 114, the boost circuit 116, the communication I/F 106, the storage 102, the communication circuit 120, and the mass storage 110 respectively, as described above.

The embodiment of FIG. 4 differs from FIG. 1 in that the storage section 402 is shown to include a storage control circuit 428. In response to one or more power indication signals (VOK) 430, the storage control circuit 428 can activate one or more control signals (RED I) which can place mass storage 410 into a lower current mode of operation. This can include any suitable current reduction action, including but not limited to: suspending all or some operations, prohibiting certain operations, reducing a speed/rate for some operations, to name just a few.

The power supply and control section 404 can generate power indication signal(s) (VOK) 430. In some embodiments, VOK 430 can be generated directly from charge reservoir 414. The charge reservoir 414 can monitor its supply, and activate VOK 430 when such a supply, e.g., stored charges, drops below a certain level. This can include, but is not limited to, monitoring a voltage level, a current level, or combinations thereof. In addition or alternatively, VOK 430 can be generated from the boost circuit 416 that generates a power supply voltage V1 for the storage section 402. Again, this can include monitoring a voltage, current (or both) provided by the boost circuit 416. In addition or alternatively, VOK 430 can be generated by the communication circuit 420 (not shown). The communication circuit 420 can monitor incoming commands received from the communication I/F 406, and if such commands indicate higher current operations, VOK 430 can be asserted.

The communications circuit 420 can operate substantially similar to the communication circuit 120 as described for FIG. 1, translating between different protocols. However, as understood from above, in some embodiments, the communications circuit 420 can include logic 432 and an instruction buffer 434. Logic 432 can determine when instructions received from the communication I/F 406 indicate high current operations. Logic 432 can activate VOK 430 if predetermined conditions are met, e.g., when instructions received indicate high current operations and/or level of charges in the charge reservoir 414 is below a certain threshold. Logic 432 can toggle VOK 430 taking into account the amount of charge present in charge reservoir 414, or can base the toggling of VOK 430 based on the received instructions from the communication I/F 406. An instruction buffer 434 can buffer instructions/data received from communication I/F 406. In some embodiments, instructions 434 can be intentionally delayed in buffer 434 to prevent high current instructions from being passed through to storage section 402, and thus enable charge reservoir 414 to be replenished.

The charge reservoir 414 can take the form of any of those described herein, or equivalents. In some embodiments, the charge reservoir 414 provides a level indication (LVL) to logic 432. Logic 432 uses LVL in determining whether to toggle VOK and/or delay the application of incoming instructions to storage section 402. In addition or alternatively, the charge reservoir 414 can provide a level indication to boost circuit 416 (not shown). Still further, in some embodiments, charge reservoir 414 can provide a level indication to directly to control circuit 428 as a power indication VOK (not shown).

Communication I/F 406 can provide power (COM_PWR) to the charge reservoir 414 and be connected to communication circuit 420 by a communication path DATA1. Power (COM_PWR) received at communication I/F 406 can take the form of any of the various embodiments described herein, including power from a single external communication I/F or multiple such external communication I/Fs. Further, in alternate embodiments, device 400 can include multiple communication I/Fs, each of which can provide power to charge reservoir 414.

Referring now to FIG. 5A, a diagrammatic representation of an operation for a storage device that changes its operation responsive to availability of power according to an aspect of the present embodiments is shown. FIG. 5B shows a timing diagram for operation of a storage device like that of FIG. 5A. FIG. 5A shows a communication I/F 506 that provides charge to the charge reservoir 514 (in this embodiment a capacitor), and the boost circuit 516 that provides power to the storage section 502 (in this embodiment a hard disk), as well as a power indication (VOK). It is appreciated that the communication I/F 506, the charge reservoir 514, the boost circuit 516 and the storage section 502 may be substantially similar to that of the communication I/F 406, the charge reservoir 414, the boost circuit 416, and the storage 402 respectively.

FIG. 5B shows waveforms for a power supply voltage (Vout) provided to the hard disk 502, a power supply current (Iout) provided to the hard disk 502, and an indication VOK signal during operations of the hard disk (HDD).

Referring to FIG. 5A in conjunction with 5B, prior to time t0, hard disk 502 can draw an amount of current (Iout) at a rate that does not adversely affect a power supply voltage (Vout). As a result, Vout can be at some nominal level (Vnom). Indication VOK can remain asserted (high in this example).

At about time t0, hard disk 302 can enter a high current mode of operation (HI I OP), as shown by an increase in the amount of current drawn (Iout). In the example shown, the increase in Iout can exceed charge provided by the charge reservoir 514, e.g., capacitor, and the boost circuit 516. As a result, Vout begins to drop. Because there is still sufficient charge in the charge reservoir 514, indication VOK can remain asserted.

At about time t1, a voltage level Vout falls to a predetermined limit Vlimit. This may indicate that the charges stored in the charge reservoir 514 has fallen too low, e.g., below a certain threshold, and a high current draw cannot be maintained and is unsustainable. As a result, indication VOK can be de-asserted (go low in this example). In response, the hard disk 502 switches to a reduced current operation (RED I OP). This reduces a current draw, as shown by Iout falling to a lower level. With hard disk current (Iout) draw at a reduced level, the charge reservoir 514 begins to replenish from power provided by the communication interface(s) 506. In the example shown, this can result in Vout rising back toward the nominal level.

At about time t2, a voltage level Vout can return to the nominal level Vnom. As a result, indication VOK can be re-asserted (return high in this example). In response, hard disk 502 returns to high current mode of operation (HI I OP). This can increase a current draw, as shown by Iout returning to a higher level.

Figure 6:
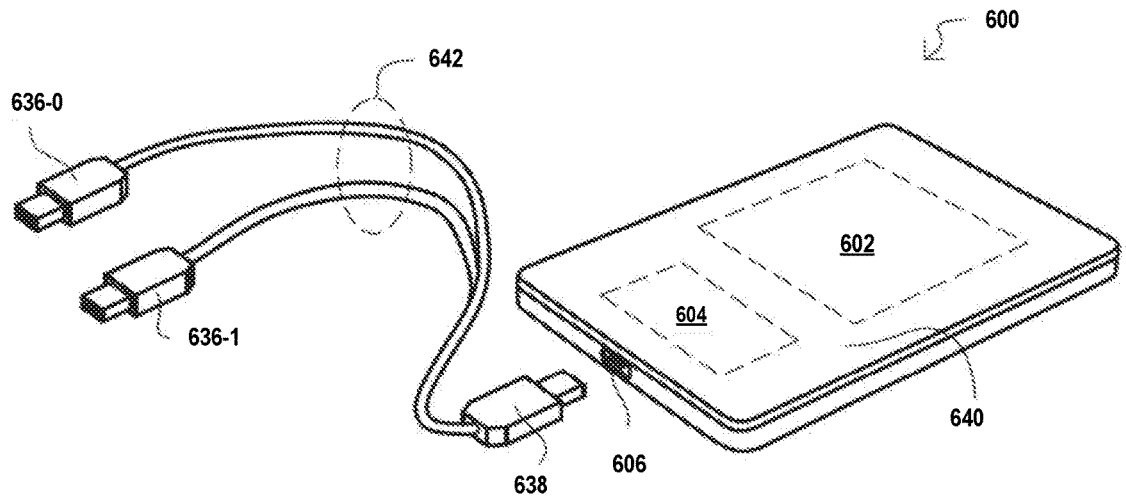
FIG. 6 shows a portable wireless storage device comprising a solid state drive according to one aspect of the present embodiments.

While embodiments can include various storage device types, a particular embodiment is shown by way of example in FIG. 6. The device 600 can be one very particular implementation of other embodiments disclosed herein. Device 600 can be portable wireless storage device that can include storage in the form of solid state storage, one or more disk drives, or combinations thereof.

Components of device 600 can be included within a housing 640, including a storage section 602 and a power supply and control section 604 according to any of the embodiments herein, or equivalents thereof.

According to some embodiments, device 600 includes a communication I/F 606 based on an industry standardized (e.g., USB). However, unlike some conventional devices, device 600 includes a charge reservoir which accumulate charges from the communication I/F 606. It is appreciated that the device 600 may be powered via the communication I/F 606 without an external battery. It is appreciated that according to some embodiments the storage section 602 is capable of executing high current operations while receiving power only from communication I/F 606. This is in sharp contrast to conventional devices that require external power supplies, such as AC/DC converter units (e.g., power bricks).

In one aspect of the present embodiments, device 600 may include, or be compatible with, a vampire type cable, which can include two or more external I/F connectors 636-0/1, which can channel power from multiple interfaces to one device I/F connector 638. In some embodiments, a communication path can exist between only one external I/F connector (636-0 or -1) and device I/F connector 638. Thus, device 600 can be sold without a power supply, as it can be connected to communication interfaces of other devices/supplies to receive power and charge its charge reservoir.

While FIG. 6 shows a device 600 that can receive all power at one communication I/F 606, other embodiments can include more than one such communication I/F and receive power from more than one communication I/Fs. Further, while FIG. 6 can include a USB compatible I/F, and I/F connectors, other embodiments can include other standardized serial communication connections and/or custom serial connections.

While embodiments above have shown devices, systems and corresponding methods, additional methods will now be described with reference to flow diagrams.

Figure 7:
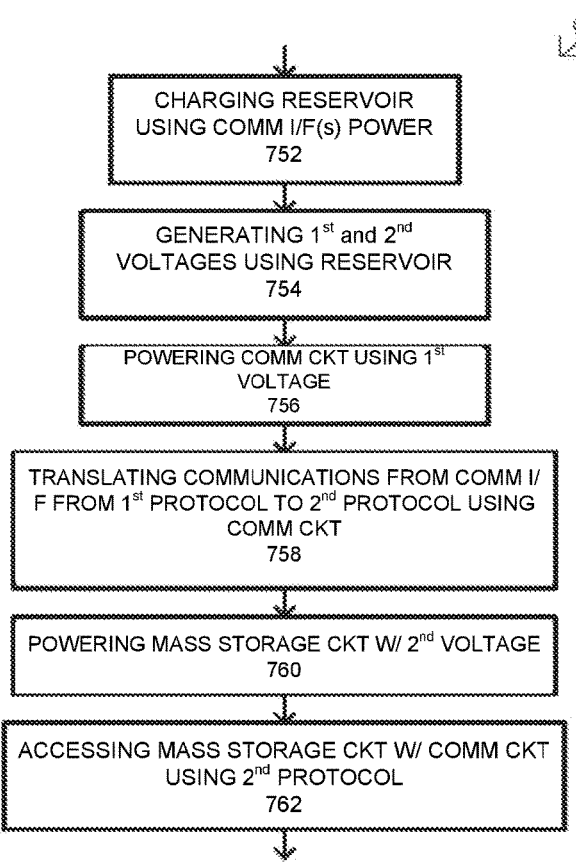
FIG. 7 shows a flow diagram for operating a device being powered by an external communication I/F only and additional power being supplemented through a charge reservoir according to an aspect of the present embodiments.

Referring now to FIG. 7, a flow diagram 750 for operating a device being powered by an external communication I/F only and additional power being supplemented through a charge reservoir according to an aspect of the present embodiments is shown. At step 752, a charge reservoir of the device is charged via one or more communication I/Fs, the stored charges of which are used during peak power to supplement power being provided by the one or more communication I/Fs. In some embodiments, such an action can include connecting a storage device to one or more external communication I/Fs of another device (e.g., host device). In particular embodiments, such an action can include utilizing vampire type cable which can provide power from one or more external communication I/Fs to a single communication I/F of the storage device.

At step 754, a first and a second voltage are generated using the reservoir (754). It is appreciated that the power used by the device may be provided through the generated first and/or second voltages in some embodiments. In some embodiments, the first and the second generated voltages may be used to supplement the power supplied by the communication I/Fs, e.g., during high peak power events. Such an action can include generating all of such voltages from a charge reservoir or supplementing the power being supplied by the communication I/Fs using the charge reservoir. At step 756, a communication circuit is powered using the first voltage. In some embodiments, this can include powering one or more ICs with a first voltage that is lower than the second voltage. At step 758, communication circuit translates from a first communication protocol to a second communication protocol. In some embodiments, this can include translating between two different serial communications protocols.

At step 760, a mass storage circuit is powered with the second voltage. In some embodiments, this can include powering mass storage circuits that include magnetic media, solid state storage, or any combination thereof. In particular embodiments this can include powering a hard disk drive.

At step 762, mass storage circuits is accessed using the second protocol using the communications circuit. Such accesses can include the storing of data in the mass storage circuits and the reading of data from the mass storage circuits. As noted above, in some embodiments a second communications protocol can be a serial communications protocol. In particular embodiments, a second communications protocol can be a hard disk communications protocol, including but not limited to SATA compatible communications.

Figure 8:
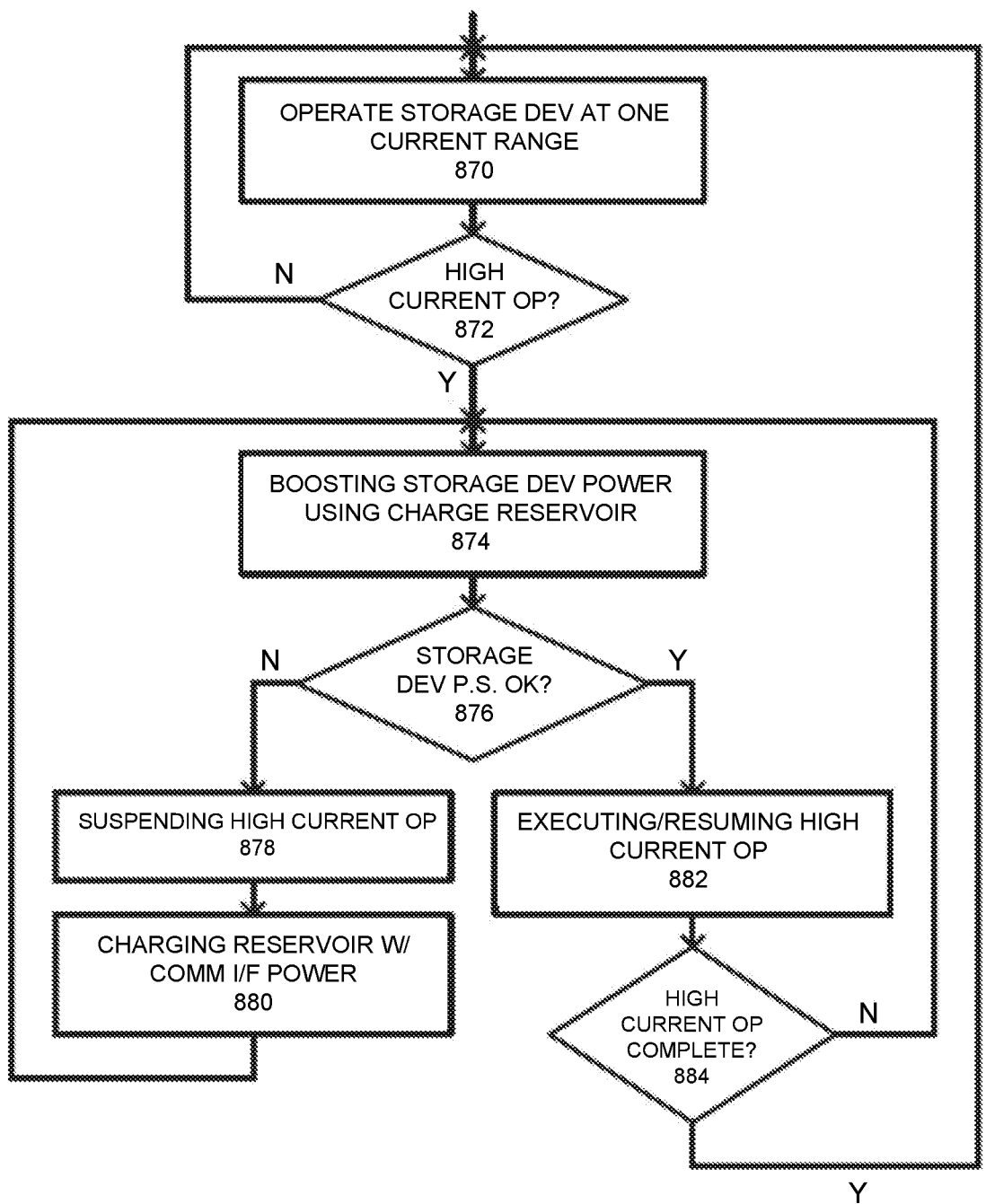
FIG. 8 shows another flow diagram for operating a device being powered by an external communication I/F only and additional power being supplemented through a charge reservoir according to an aspect of the present embodiments.

Referring now to FIG. 8, another flow diagram 850 for operating a device being powered by an external communication I/F only and additional power being supplemented through a charge reservoir according to an aspect of the present embodiments is shown. At step 870, a storage device is operated at a one current range, e.g., a disk drive device being operated below a predetermined current draw limit.

At step 872, a storage device is monitored for a high current operation. Such action can include any of: monitoring a supply voltage or current to a storage device, or monitoring operations that are being executed by the storage device, or operations that are to be executed by the storage device in the future.

In the absence of high current operations (N at step 872), a method can continue to operate at the one current level according to step 870. At step 874, if a high current operation is detected (Y from step 872), a power provided to the storage device can be boosted using a charge reservoir. Such an action can include generating a supply voltage/current for the storage device from the charge reservoir. However, in other embodiments such an action can include selectively connecting a charge reservoir to a power supply as needed.

At step 876, the storage device is monitored to determine if a power supply of the storage device is okay. For example, it may be determined whether a current draw from the storage device will exceed the current which can safely be provided, even taking into account the boost provided by the charge reservoir. In one aspect of the present embodiments this can include monitoring a supply voltage. However, as noted above, in other embodiments this can include monitoring a supply current and/or monitoring a set of incoming instructions.

At step 878, high current operations of the storage device is suspended if a power supply to the storage device is determined not to be okay or safe. Such an action can include suspending all operations/capabilities of the storage device, or only some, higher current drawing operations/capabilities. In other embodiments, such an action may also include delaying the application of instructions being provided to the storage device. With high current operations suspended, at step 880 the charge reservoir is charged with power from one or more communication I/Fs and the operation return to step 874.

At step 882 high current operations are executed (or resume suspended high current operations) of the storage device if a power supply to the storage device is determined to be okay. For example, all operations/capabilities of the storage device may be enabled. In other embodiments, such an action can include forwarding previously buffered instructions to the storage device. At step 884, it is determined whether high current operations are complete. If such operations are not complete (N from 884) the method 850 returns to step 874. If such operations are completed (Y from 884) the method 850 returns to step 870.

Figure 9:
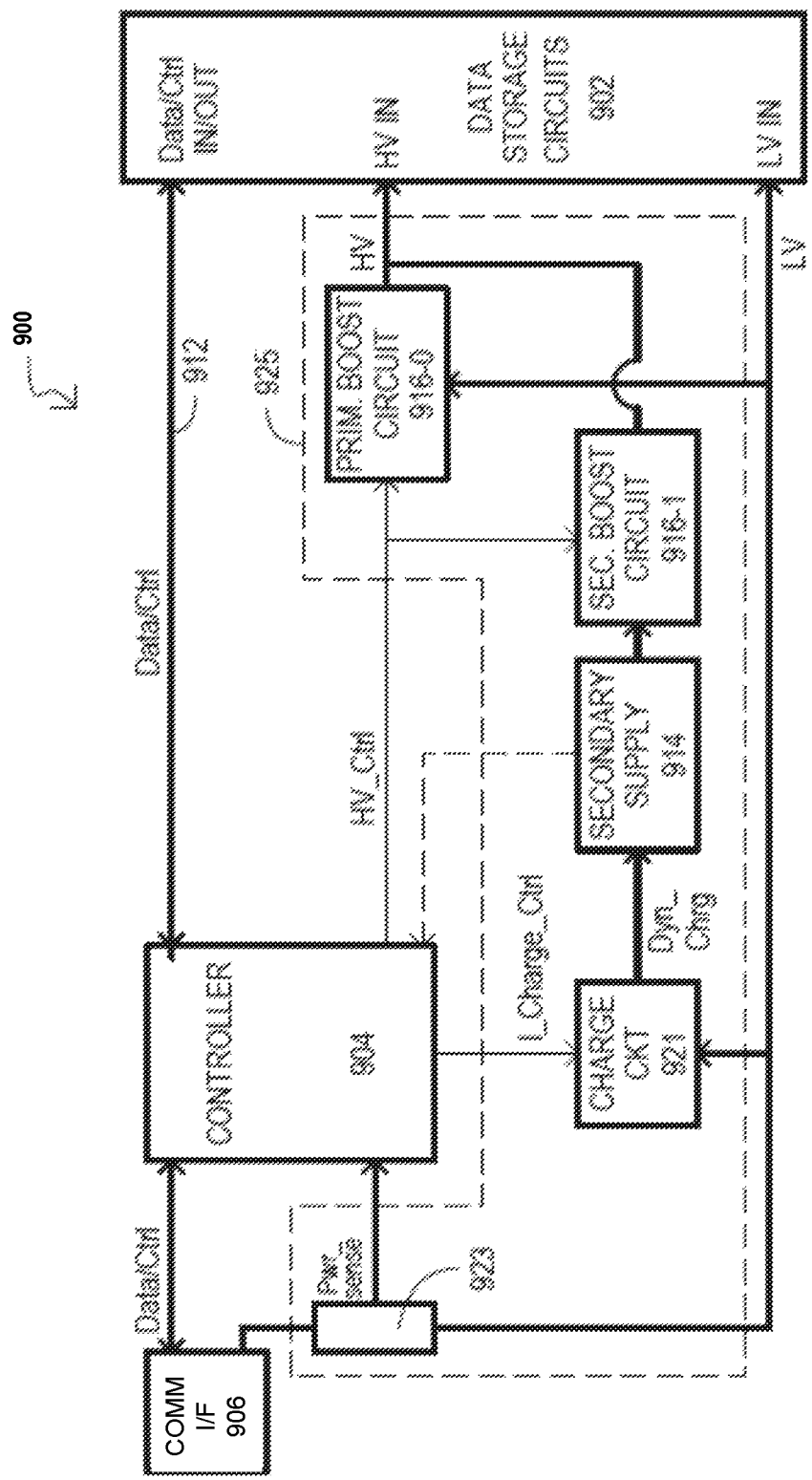
FIG. 9 is a current limiting device with a boost circuitry to supplement power during high power events according to one aspect of the present embodiments

Referring now to FIG. 9, device 900 according to another aspect of the present embodiments is shown. In some embodiments, the device 900 can be a portable storage device that enables access to a large amount of storage over a single powered communication interface without the need for an external power supply. That is, all working power is derived from a single, powered communication I/F. In one embodiment, device 900 may be one implementation variation of that shown in FIG. 4. It is also appreciated that use of a singled powered communication interface is for illustrative purposes and should not be construed as limiting the embodiments. For example, multiple communication interfaces in combination may form the single powered communication interface, as shown.

The device 900 includes a data storage circuit 902, a controller 904, a communication I/F 906, and a power section 925. The data storage circuit 902 may receive low voltage power (LV), a higher voltage power (HV), and it may communicate over a storage I/F 912. It is appreciated that in some embodiments, a higher voltage HV can be greater than 5V, or greater than 10V, and in particular embodiments about 12V. A lower voltage LV may be equal to or less than about 5V.

The data storage circuits 902 may include storage media and corresponding circuits and devices for accessing data according to signals received over a storage I/F 912. For example, the data storage circuits 902 may include any suitable storage mediums including but not limited to magnetic or related media, solid-state storage circuits (both nonvolatile and nonvolatile), or any combinations thereof. Operations of the data storage circuits 902 may include higher current events and lower current events. In particular embodiments, the data storage circuits 902 can include a HDD having multiple platters, with a storage capacity no less than 4 terabytes (TB), in some embodiments no less than 6 TB, in particular embodiments about 8 TB or more. In some embodiments where data storage circuits 902 include an HDD, such an HDD can have a small form factor for an advantageously compact and light package, including but not limited to a 3.5" or smaller HDD form factor.

The communication I/F 906 can be a single communication interface, e.g., port, that provides both power and a data communications path. As presented above, any number of communication interfaces may be present. As such, discussion of a single communication interface is for illustrative purposes and should not be construed as limiting the scope of the embodiments. In some embodiments, the communication I/F 906 may be a serial data communication I/F that provides a power supply voltage, e.g., less than 8V, less than 6V, no more than about 5V, etc. In a particular embodiment, the communication I/F 906 can be a type-C USB type interface. The power section 925 may include a power detector 923, a charge circuit 921, a secondary supply 914, a primary boost circuit 916-0 and a secondary boost circuit 916-1. The power detector 923 detects power delivered at a host interface (e.g., communication I/F 906). According to some embodiments, the power detector 923 senses the input power reaching the maximum specified level for the communication I/F 906.

Power detector 923 may provide a power sense signal Pwr_sense to the controller 904. Such a value can be an analog value, or can be a digital value created by an analog-to-digital conversion. The controller 904 is configured to limit the current from the communication I/F 906 such that the limits set by standard bodies is not exceeded. In some embodiments, the controller 904 may reduce and limit the power by reducing the PWM duty cycle of the primary boost circuit 916-0, thus causing the output voltage of the primary supply 916-0 to become the same as the secondary boost circuit 916-1 voltage.

The primary boost circuit 916-0 generates a HV power supply from the LV power supply, according to some embodiments. It is appreciated that the primary boost supply 916-0 may include a boost regulator circuit.

The charge circuit 921 may charge the secondary supply 914 according to control values (I_Charge_Ctrl) provided by controller 904. In some embodiments, the charge circuit 921 can vary a charge current and/or voltage provided to secondary supply 914 as well as a depth of discharge. In particular embodiments, according to control values I_Charge_Ctrl, charge circuit 921 can decrease, cease and/or increase a charge current being provided to the secondary supply 914.

The secondary supply 914 can store electrical charges for use in boosting the HV supply for the data storage circuits 902. It is appreciated that the secondary supply 914 may store electrical charges suitable for the anticipated use of the device 900 during peak power events. In some embodiments, the secondary supply 914 may be battery. However, it is appreciated that the secondary supply 914 may be any mechanism to store electrical charges, e.g., a capacitor (including a supercapacitor), or battery/capacitor combination, etc.

In some embodiments, the secondary boost circuit 916-1 generates a HV power supply from secondary supply 914 during peak power events in order to supplement the power bring provided through the communication I/F 906, which is insufficient to power the high power events. In some embodiments, the secondary boost supply 916-0 may be a boost regulator circuit.

As shown, outputs of primary and secondary boost circuits 916-0/1 provide a HV supply to data storage circuit 902. In particular embodiments, the primary boost circuit 916-0 generates a nominal HV level. However, if a LV supply becomes constrained, this level can drop below the nominal level. At the same time, the secondary boost circuit 916-1 generates a voltage just below the nominal HV level. A diode or equivalent circuit structure can be present at the output of the secondary boost circuit 916-1 to ensure the secondary boost voltage is provided only when the output by the primary boost circuit falls below a given threshold, in response to insufficient power at the LV supply.

The controller 904 can actively control power supply operations in device 900. In particular, various power supply functions can be started, stopped, reduced and/or increased in response to detected or anticipated power availability. In a particular embodiment, the controller 904 can selectively steer current between a LV supply to data storage circuits 902, a LV supply to the primary boost circuit 916-0, and an LV supply to the charge circuit 921 (to charge secondary supply 914). Such control can enable a prioritization of power supply functions, as will be described in more detail below.

The controller 904 can also determine LV power availability in order to control various power supply functions. In some embodiments, the controller 904 detects a voltage and/or current of the host provided, via the communication I/F 906, LV supply using a power sense circuit 923 as described herein. However, in addition or alternatively, the controller 904 may anticipate power supply availability based on received host commands/requests.

In some embodiments, the controller 904 may be configured to control operations of the primary and the secondary boost circuits (916-0/1) to increase and/or decrease power. In a particular embodiment, the primary and/or the secondary boost circuits (916-0/1) may include charge pump circuits, and the controller 904 may alter pumping cycles to increase/decrease power.

In some embodiments, the controller 904 can control the charge circuit 921 to vary charging levels associated with the secondary supply 914. For example, the controller 904 may vary a charge current magnitude and/or limit a maximum charge level of the secondary supply 914. In some embodiments, depth of discharge limiting can be performed by the charge circuit 921.

In some embodiments, the controller 904 can limit a depth of discharge for the secondary supply 914. That is, the controller 904, by controlling the charging and/or discharging of the secondary supply 914, can limit the voltage of the secondary supply 914 to a value less than its maximum.

In some embodiments, the controller 904 can control operations of data storage circuit 902 to limit operations in the event actual or anticipated available power falls below some level. Such operations can include any of those described above, or equivalents, including but not limited to a power indication (e.g., VOK) and/or buffering requests or otherwise delaying or not handling requests, issuing busy signals, etc. Such communications with data storage circuits 902 can occur over storage I/F 912.

Having described the general sections of the device 900, operations of the device will now be described.

Upon receiving power (LV), e.g., via the communications I/F 906, from a host external to the device 900, the controller 904 can (1) provide LV power to data storage circuits 902, (2) boost the LV supply to the HV level using the primary boost circuit 916-1 and provide such HV power to data storage circuits 902, and (3) charge the secondary supply 914.

In the event that the LV power from the host is not sufficient for some higher peak power operations of data storage circuit 902, the secondary boost circuit 916-1 can boost the HV power using the charges stored in the secondary supply 914, responsive to the control signals from the controller 904. In addition, the controller 904 may reduce and/or stop the charging of the secondary supply 914, as needed.

In some embodiments, a capacity of the secondary supply 914 is sufficient to handle any expected power draws of the data storage circuits 902. Thus, it is expected that the LV power levels/draws periodically return to the levels that enable the secondary supply 914 to be recharged. However, in other embodiments, if power falls below a certain threshold, or continues to be insufficient to the point where the charge from secondary supply 914 falls too low, the controller 904 may disable particular operations of data storage circuits 902 until secondary supply 914 is sufficiently recharged. In some embodiments, if the power falls below a certain threshold during high power events, the controller 904 may issue a busy signal between the data storage 902 and the communication I/F 906 in order to pause any high power event and allow the power being received via the communication I/F 906 to be diverted to the charge circuit 921 and charge the secondary supply 914. Once the charges stored on the secondary supply 914 reach a certain threshold, the controller 904 may stop issuing the busy signal in order to resume with the high power event.

In the event that the LV power returns to a higher level or the power draw by the data storage circuits 902 subsides, the controller 904 is configured to reduce and/or stop operations of the secondary boost circuits 916-0, thereby allowing the primary boost circuits 916-1 to generate all the HV power. Further, the controller 904 resumes and/or increases the charge current provided by the charge circuit 921 to replenish the secondary supply 914.

According to some embodiments, the device 900 can maintain a priority among power supply circuits, and dynamically change power configurations according to conditions. In some embodiments, the controller 904 can prioritize the supply of power as follows (1) LV supply to data storage circuits 902, (2) LV supply to the primary boost circuit 916-0 and (3) LV supply to the charge circuits 921. In a particular embodiment, an LV supply to the data storage circuits 902 can be essentially never interrupted. The primary boost circuit 916-0 can be operated to allow a HV supply to the data storage circuits 902 to "sag," thus falling from a nominal level. Further, the charge circuit 921 may dynamically alter the amount of current provided to charge the secondary supply 914 based on a power availability status.

Figure 10:
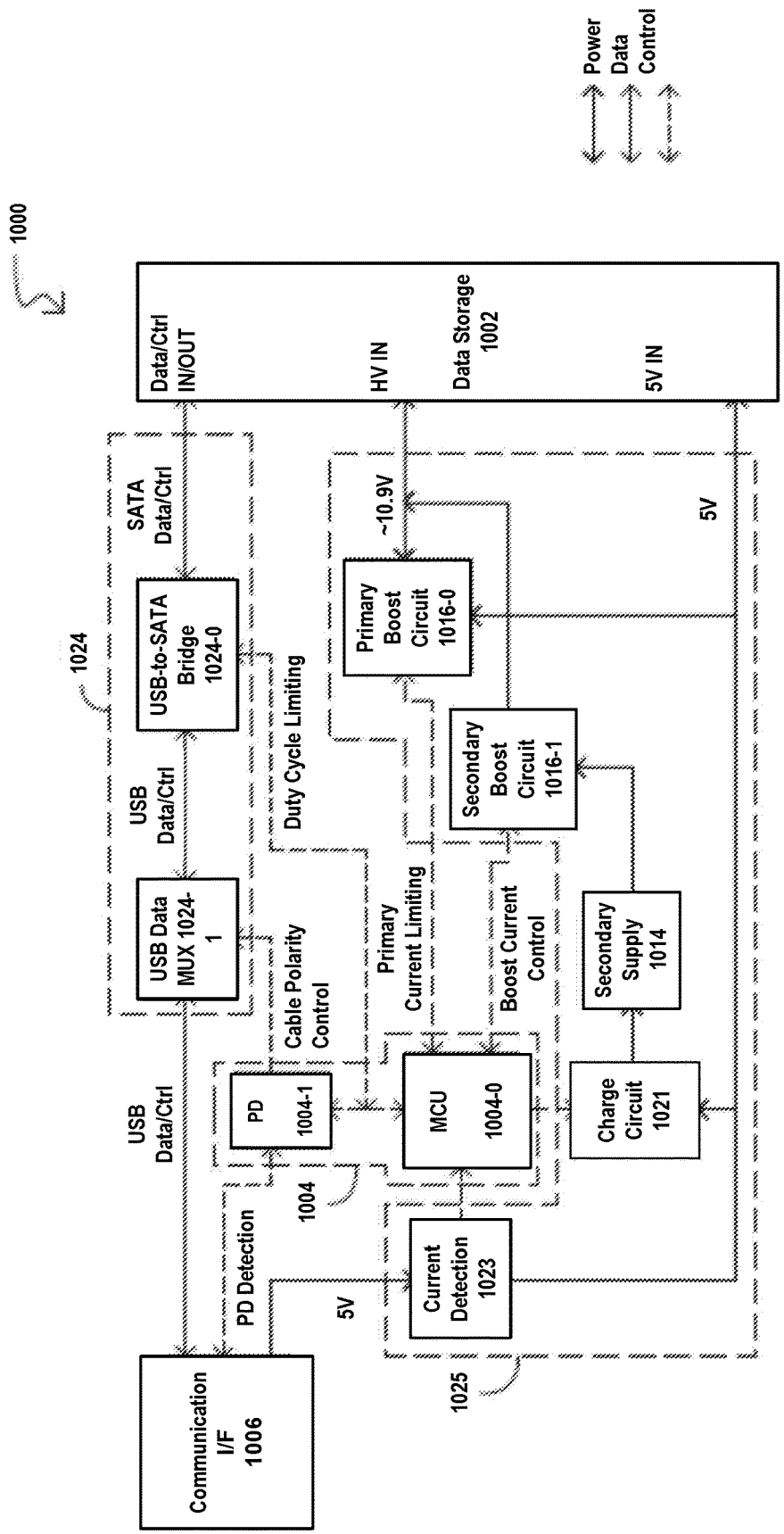
FIG. 10 is another current limiting device with a boost circuitry to supplement power during higher power events in accordance with one aspect of the present embodiments.

Referring now to FIG. 10, a device 1000 that is current limited while it includes a boost circuitry to supplement power during higher power events in accordance with one aspect of the present embodiments is shown. In a particular embodiment, the device 1000 may be one implementation variation of that shown in FIG. 9. In some embodiments, a device 1000 may be a portable HDD storage device that receives all power from a single type-C USB connection.

A device 1000 may include a data storage circuit 1002, a controller section 1004, a communication I/F 1006 (in this illustrative embodiment a USB type-C connector), a power section 1025, and a bridge section 1024. The data storage circuit 1002 may be a variation of the one described in FIG. 9. In one embodiment, a data storage circuit 1002 can be a HDD that receives a LV of about 5V, a HV of about 11V (e.g., 10.8 V), and communicates via SATA type storage I/F 1024. In a particular embodiment, an HDD can be a 3.5" HDD having a capacity no less than about 8 TB. However, as noted above, in alternate embodiments a data storage circuit 1002 can include a type of solid state storage or a combination of solid state storage and a HDD.

It is appreciated that new standards have made it clear that the standard is referring to absolute power and not the root mean square (RMS) power. As such, devices are generally power limited to comply with the set standard. For example, in some embodiments, the device 1000 is current limited, e.g., 1.5 Amp, to limit the power received from the communication I/F 1006, e.g., 7.5 Watt. During certain operating modes, an increased power may be needed, e.g., during spin up of the hard drive, during read/write operation of the outer diameter of the disk, etc.

The embodiments described herein, comply with the current standards to limit the power being drawn from the communication I/F 1006 while meeting the increased power requirement needs during certain operating modes. The ability to comply with the standards and meet the increased power requirement needs can be achieved in a number of different ways. For example, in some embodiments, a power section 1025 can be used to limit the power drawn through the communication I/F 1006 while having mechanisms to meet the increased power requirements, the details of which is described below.

It is appreciated that the communication I/F 1006 can take the form of any of the described interfaces described herein. In a particular embodiment, communication I/F 1006 is a type-C USB I/F.

In some embodiments, the power section 1025 includes a current detector 1023, a charge circuit 1021, a secondary supply 1014, a primary boost circuit 1016-0 and a secondary boost circuit 1016-1. It is appreciated that the charge circuit 1021 may be a 4.1 V battery charger, in some embodiments. Moreover, the secondary supply 1014 may be a 2.2 AHr battery according to some embodiments, In one aspect according to some embodiments, the primary boost circuit 1016-0 is a 10.9 regulator and the secondary boost circuit 1016-1 is a 10.8 V regulator.

In some embodiments, the current detector 1023 detects an amount of current flowing from a host, e.g., single type-C USB, LV (e.g., 5V) supply via communication I/F 1006. Such a current value can be provided to controller section 1004. In response, the controller section 1004 may dynamically vary the power supply operations. In some embodiments, the current detector 1023 may include a resistor to generate a sense voltage. In response to the detected current, the microcontroller unit 1004-0 that is a part of the controller section 1004 may lower the amount of drawn power if the detected current is reaching the set standard limit or alternatively may increase the amount of drawn power if the detected current is too far below the set standard limit. In other words, the controller section 1004 that receives power from the communication I/F 1006 is current limiting.

In the embodiment shown, the charge circuit 1021 can be a battery charger circuit that can charge the secondary supply 1014 which is a battery. The charge circuit 1021 can be dynamically controlled by a controller section 1004, e.g., the microcontroller unit 1004-0, to provide any or all of the following features (1) vary a charge current supplied to secondary supply 1014 based on power levels by the charge circuit 1021, (2) limit a charge level of the secondary supply 1014 to less than its maximum value, and (3) limit a depth of discharge for the secondary supply 1014. Limiting a charge limit and depth of charge can advantageously increase the cycle life of the secondary supply 1014.

In one embodiment, the charge circuit 1021 receives LV power at about 5V and provides a charge current that can vary from 0 to 1000 mA to the secondary supply 1014. The amount of charge current can be controlled according to a pulse width modulated (PWM) signal provided from controller section 1004. According to some embodiments, a secondary supply 1014 can have a maximum charge limit, and can be charged to a level below the maximum limit. In some embodiments, it can be less than 80% of the limit, in a particular embodiment no more than 90% of the limit. In one embodiment, a secondary supply can be a 4.2V battery that is charged only to 4.1V. According to some embodiments, a depth of discharge for the secondary supply 1014 can be limited to less than 10%, in some embodiments less than 5%, in a particular embodiment no more than 3%.

It is appreciated that in general the primary boost circuit 1016-0 provides power to the data storage circuit 1002. However, during initial read/write at startup an increased power may be needed and after a certain period the voltage provided by the primary boost circuit 1016-0 may sag. Accordingly, the secondary boost circuit 1016-1 can generate power for boosting a HV supply when a primary boost circuit 1016-0 cannot meet power requirements on its own. In general, the current detection 1023, the primary boost circuit 1016-0, and the microcontroller unit 1004-0 form an outer loop that limit the current being drawn from the communication I/F 1006. During certain operating modes, the voltage being provided by the primary boost circuit 1016-0 to the data storage 1002 sags while the current remains constant. The sag in voltage is detected by the microcontroller unit 1004-0 that activates an inner voltage loop that comprises the microcontroller unit 1004-0, the charge circuit 1021, the secondary supply 1014, and the secondary boost circuit 1016-1. In other words, the microcontroller unit 1004-0 enables the charge circuit 1021 and the secondary supply 1014 to provide power to the secondary boost circuit 1016-1 in order to compensate the sagging voltage of the primary boost circuit 1016-0. Thus, the microcontroller unit 1004-0 enables the secondary boost circuit 1016-1 to provide additional power to the data storage circuit 1002 during peak power mode while the amount of current being drawn from the communication I/F 1006 remains constant, thereby meeting the standard's requirement.

The primary boost circuit 1016-0 may generate a HV supply for data storage circuits 1002. In one embodiment, the primary boost circuit 1016-0 can be a synchronous type boost regulator for greater efficiency in comparison to an asynchronous type boost regulator. However, it is appreciated that asynchronous type boost regulator may also be used. In one embodiment, the primary boost circuit 1016-0 provides an output voltage of about 10.9V, while the secondary boost circuit 1016-1 provides an output voltage of about 10.8V. Primary boost circuit 1016-0 can be controlled by signal "Primary Current Limiting" provided by controller section 1004. In particular embodiments, such control can enable a current from the primary boost circuit 1016-0 to be increased or decreased as needed. As noted for embodiments herein, an output of primary boost circuit 1016-0 can be allowed to "sag" (e.g., fall below 10.9V) and the secondary boost circuit 1016-1 then boosts the HV supply for the data storage circuits 1002.

As shown, the secondary boost circuit 1016-1 generates a boost voltage from the power provided from secondary supply 1014. In one embodiment, the secondary boost circuit 1016-1 is an asynchronous type boost regulator, for a more compact circuit than a synchronous type boost regulator. In one embodiment, the secondary boost circuit 1016-1 provides an output voltage of about 10.8V, while the primary boost circuit 1016-0 provides an output voltage of about 10.9V. It is appreciated that the secondary boost circuit 1016-1 can be controlled by signal "Boost Current Control" provided by controller section 1004. In some embodiments, such control can enable a current from secondary boost circuit 1016-1 to be increased or decreased as needed.

In some embodiments, the bridge section 1024 provides a control and data path between communication I/F 1006 and the data storage circuit 1002. It is appreciated that in some embodiments, the bridge section 1024 may translate between different communications protocols associated with the data storage circuit 1002 and the external connection connected to the device 1000 via the communication I/F 1006. For example, in one aspect of the present embodiments the bridge section 1024 translates between accesses according to a USB protocol and those of a SATA protocol. In some embodiments, the bridge section 1024 includes a USB data MUX 1024-1 and a USB-to-SATA bridge circuit 1024-0. The USB data MUX 1024-1 controls a flow of data in response to a Polarity Control value provided from controller section 1004. The USB-to-SATA bridge circuit 1024-0 may operate similar to those described above with respect to FIGS. 3 and 4. In one aspect according to some embodiments, the controller section 1004 has a power control path (Duty Cycle Limiting) to data storage circuits 1002 via USB-to-SATA bridge circuit 1024-0.

The controller section 1004 may actively control power supply operations as described above. In one embodiment, the controller section 1004 includes a microcontroller (MCU) 1004-0 and a power delivery (PD) circuit 1004-1. The MCU 1004-0 may actively control the power by steering host power current between data storage circuits 1002, primary boost circuit 1016-0 and charge circuit 1021. MCU 1004-0 may control primary and secondary boost circuits (1016-0/1) in a dynamic fashion, including controlling the amount of current each delivers.

In addition or alternatively, MCU 1004-0 can control operations of data storage circuits 1002, including placing such circuits in low power modes. As but two very particular examples, MCU 1004-0 can (e.g., via USB-to-SATA circuits 1024-0) send busy signals to a host over communications I/F 1006, to limit operations until power conditions change and/or delay operations within data storage circuits 1002, such as delaying a spin-up of a hard disk. MCU 1004-0 can also be in communication with the PD circuit 1004-1 to receive information on what power levels that a host can deliver, and control power operations based on such host power levels. In one embodiment, the MCU 1004-0 may be a 32-bit microcontroller, such as the STM32F051 microcontroller produced by STMicroelectronics of Huntsville, Ala. U.S.A. However, alternate embodiments can include any other suitable control circuits, including other microcontrollers, microprocessors and/or control logic, field programmable gate arrays (FPGAs), or any combination thereof.

The PD circuit 1004-1 is connected to the communications I/F 1006 and can communicate with a host to determine or negotiate power delivery from a host. In one embodiment, the communications I/F 1006 can be a USB I/F and the PD circuit 1004-1 may communicate according to a USB protocol to determine or negotiate host power. Such information can be provided to MCU 1004-0, which can use such information to control power operations of the device 1000.

It is appreciated that in some embodiments, the microcontroller unit 1004-0 may control the charging and discharging of the secondary supply 1014 through the charge circuit 1021. For example, during high peak power, the charge available on the secondary supply may reach a threshold value, e.g., low value. In order to avoid disruption to the operation of the device, the microcontroller unit 1004-0 may issue a busy signal, e.g., 30% of the time, between the communication I/F 1006 and the data storage 1002. As such, the read/write speed, for example, is throttled allowing the power from the communication I/F 1006 to be diverted to the secondary supply 1014 in order to charge the secondary supply 1014. The control mechanism of the microcontroller unit 1004-0, e.g., by issuing busy signals at time during high peak power and when the secondary supply 1014 reaches a certain threshold, therefore, enables the secondary supply 1014 not to completely discharge and get charged when it reaches a certain threshold while avoiding operation disruption to the data storage 1002.

While the description of FIGS. 9 and 10 show devices and methods according to embodiments, additional methods will now be described.

Figure 11:
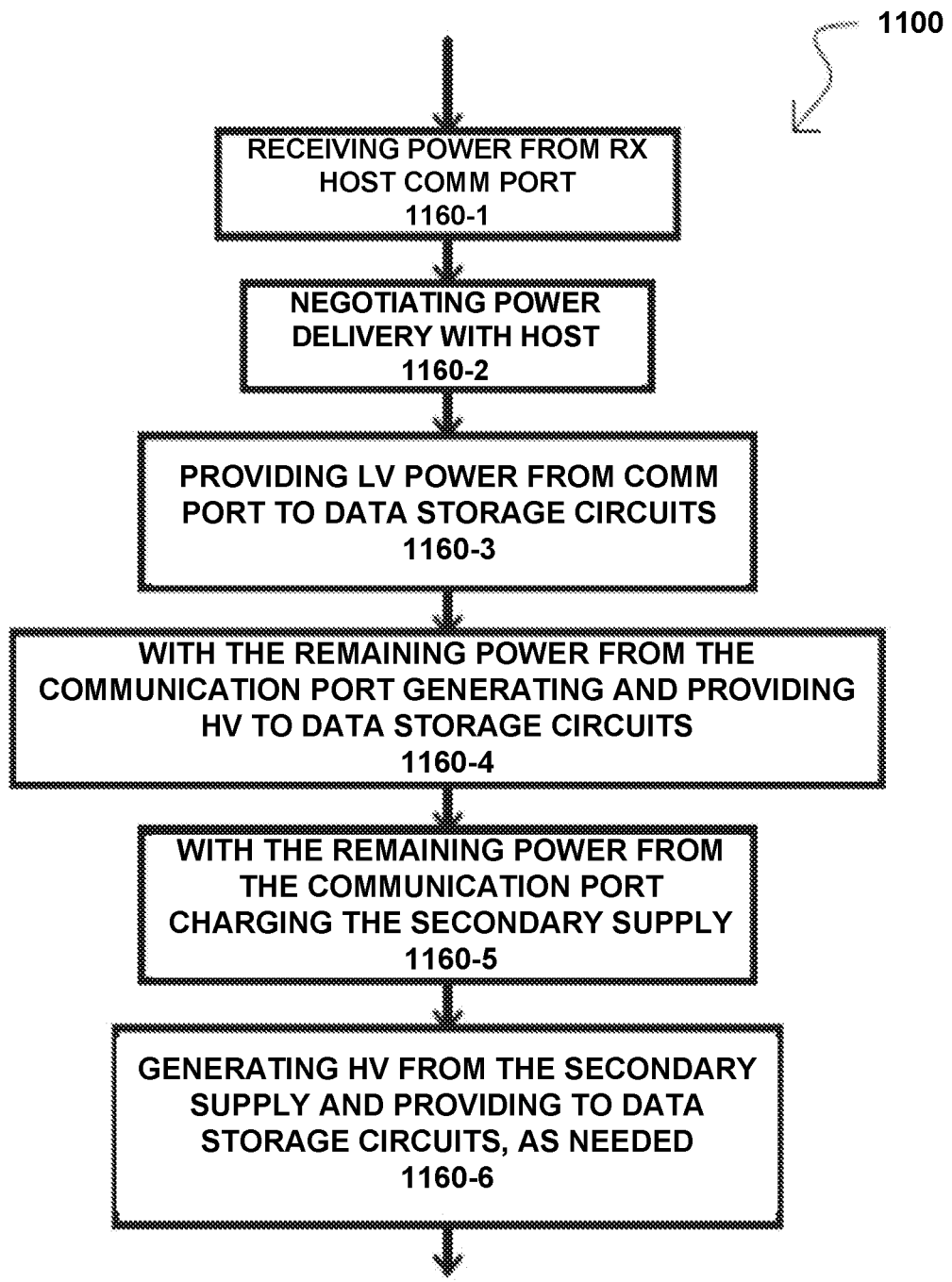
FIG. 11 is a flow diagram for supplementing the power needs of a device during high power events in accordance with one aspect of the present embodiments.

Referring now to FIG. 11, a flow diagram 1100 for supplementing the power needs of a device during high power events in accordance with one aspect of the present embodiments is shown. At step 1160-1, the device received power from a host communication port. In some embodiments this can include receiving power from a single communication port connection. In particular embodiments, the device may be powered through connection made between a portable storage device with a host via a single USB type connection, such as a type-C connection.

Optionally, at step 1160-2, power delivery with a host may be negotiated. In some embodiments, this can include negotiating power delivery with a host according to the USB protocol.

At step 1160-3, a low voltage (LV) power is provided from a communications port to data storage circuits. In particular embodiments, this can include providing a voltage of no more than 5V to a storage circuit that includes a HDD.

At step 1160-4, with the remaining power from a communications port, a high voltage can be generated and provided to the data storage circuits. In some embodiments, a HV current delivered can be varied according to power conditions. For example, in particular embodiments, a voltage greater than 8V may be generated from a communications power voltage of no more than 5V. In another embodiment, a voltage of about 11V may be generated from a USB 5V source.

At step 1160-5, with the remaining power from the communications port, the secondary supply can be charged. For example, a battery, a capacitor (including super capacitor) or a combination thereof, etc., may be charged. In some embodiments, a charge current delivered may vary according to power conditions. In particular embodiments, this can include charging a battery to a voltage less than that of the LV level.

At step 1160-6, as needed, the HV is generated from the secondary supply and provided to the data storage circuits. In some embodiments this can supplement the power at step 1160-3 in order to address high power event. For example, In some embodiments a voltage greater than 8V is generated from the secondary source voltage of no more than 5V. In one embodiment, a voltage of about 11V may be generated from a battery of about 4V.

Figure 12:
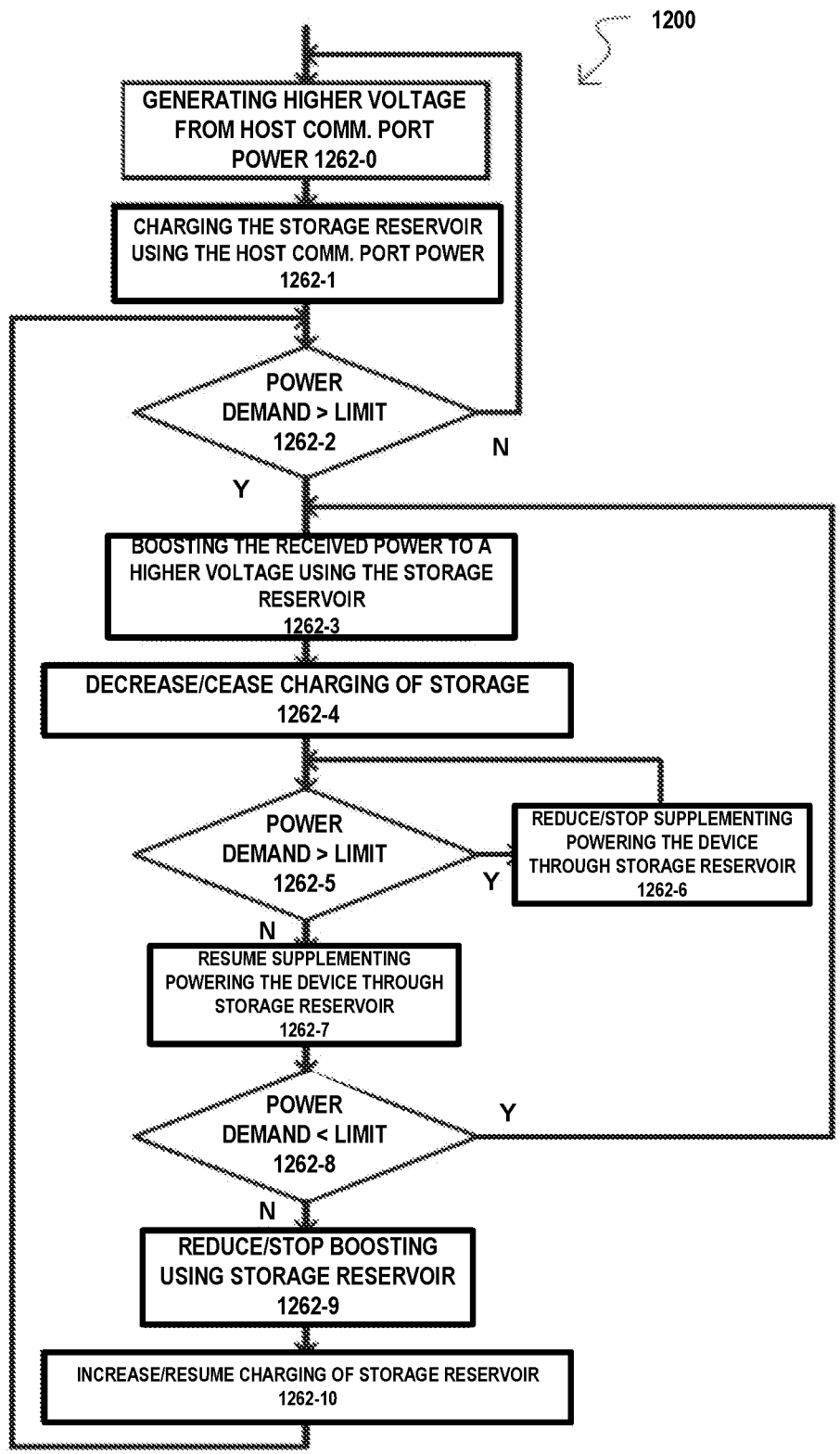
FIG. 12 is another flow diagram for supplementing the power needs of a device during high power events in accordance with another aspect of the present embodiments

Referring now to FIG. 12, a flow diagram 1200 for supplementing the power needs of a device during high power events in accordance with another aspect of the present embodiments is shown. At step 1262-0, a higher voltage is generated from the power received from the host communication port. It is appreciated that the generated voltage may be used by the data storage circuits and the power may be received at a single communications port. However, as described above, powering the device via a single communication port is for illustrative purposes and should not be construed as limiting the embodiments. For example, more than one communication port may be used and the combination (aggregation) of the power may be shown as a single communications port, as presented above.

At step 1262-1, a storage reservoir may be charged via the host communications port power. In some embodiments, the storage reservoir may include a battery, capacitor, or the like.

A power demand level can be monitored and examined, at step 1262-2. For example, the actual or anticipated power levels consumed by data storage circuits and/or the power levels provided at the communications port may be determined. It is understood that such an action can include determining actual power levels (current sourced) or anticipated power levels. In the embodiment described in FIG. 12, the power monitoring and examination may include comparing power demand by the device to some limit. If power demand is below a certain level (N from 1262-2), the method 1200 can continue actions 1262-0 and 1262-1, as described above.

If power demand is above the certain level (Y from 1262-2), the method 1200, at step 1262-3 boosts the received power to a high voltage using the storage reservoir. In addition or alternatively, a charging of the storage reservoir can be decreased and/or ceased 1262-4.

At step 1262-5, the power demand level can then be monitored and examined, similar to step 1262-2. This can determine the actual or anticipated power levels as noted above. Such a limit can be the same as a previous level (i.e., for 1262-2), or different. For example, it may be determined whether the power levels have been below some level for an extended period of time. In the embodiment described in FIG. 12, the power monitoring and examination may include comparing power demand by the device to the limit set at step 1262-5 which may be the same or different from the limit of step 1262-2. If power demand is above the certain level (Y from 1262-5), at step 1262-6, the supplementing of power using the storage reservoir is reduced or stopped. Such an action can include limiting or delaying high current draw functions of an HDD assembly.

If power demand is not above the certain level (N from 1262-5), the method 1200 resumes or continues to supplement powering the device through the storage reservoir, at step 1262-7.

At step 1262-8, the power demand level can then be examined again to determine whether it exceeds a certain limit, similar to the steps described above. In some embodiments, such a limit can be the same as those in steps 1262-2 or 1262-5 or it may be different. If power demand continues to be above the certain level (Y from 1262-5), the method 1200 continues to step 1262-3 (i.e., continue to boost a HV and/or decrease/stop charging the storage reservoir).

If power demand is not above the certain level (N from 1262-8), the method 1200 at step 1262-9 reduces or ceases boosting of the higher voltage using the storage reservoir. At step 1262-10, the charging of the storage reservoir may be increased and/or resumed and the operation returns to step 1262-2.

Figure 13:
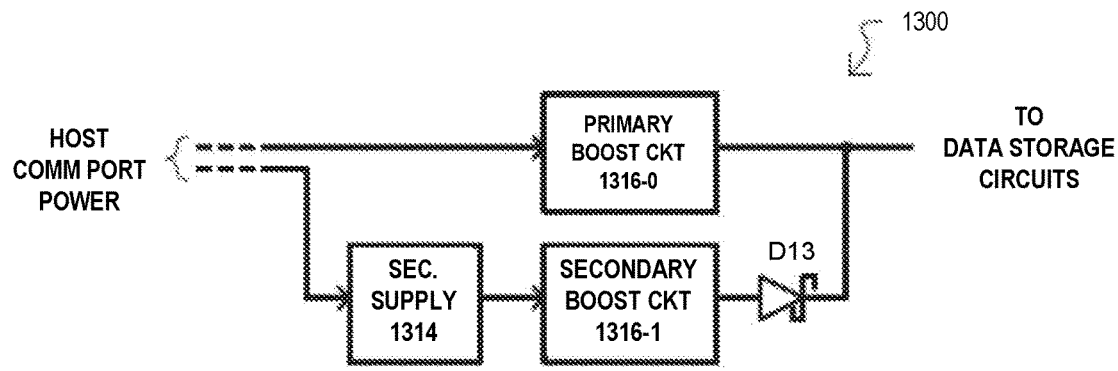
FIG. 13 is a device for boosting power according to one aspect of the present embodiments.

Referring now to FIG. 13, a device 1300 for boosting power according to one aspect of the present embodiments is shown. The power boosting arrangement may include a primary boost circuit 1316-0, a secondary supply 1314, and a secondary boost circuit 1316-1. The primary boost circuit 1316-0 is configured to generate a higher voltage from a lower host communication port voltage, e.g., received through the host communication port. The secondary supply 1314 is charged from the power received from a host via the host communication port, as described above. The secondary boost circuit 1316-1 may boost the voltage from the host communication port power by supplementing it with the electrical charges stored on the secondary supply 1314.

In some embodiments, the primary boost circuit 1316-0 can provide an output voltage higher than that of the secondary boost circuit 1316-1. The device 1300 includes a diode D13 in order to prevent current feedback from the higher voltage primary boost circuit 1316-0 to the lower voltage secondary boost circuit 1316-1. In some embodiments, the diode D13 can be a Schottky diode. It is, however, appreciated that the use of Schottky diode is for illustrative purposes and should not be construed as limiting the scope of the embodiments.

Figure 14A:
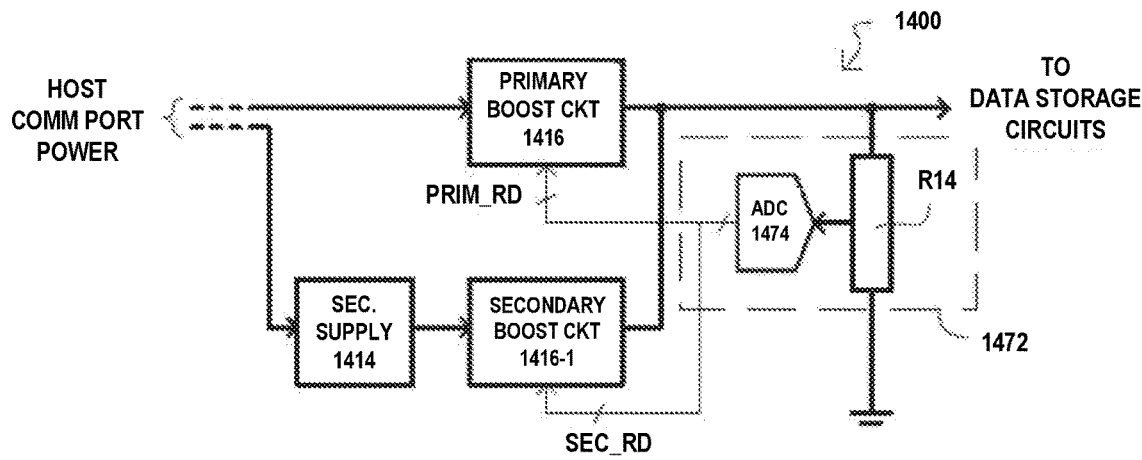
FIGS. 14A and 14B show a device for boosting power according to one aspect of the present embodiments along with its associated timing diagram.
Figure 14B:
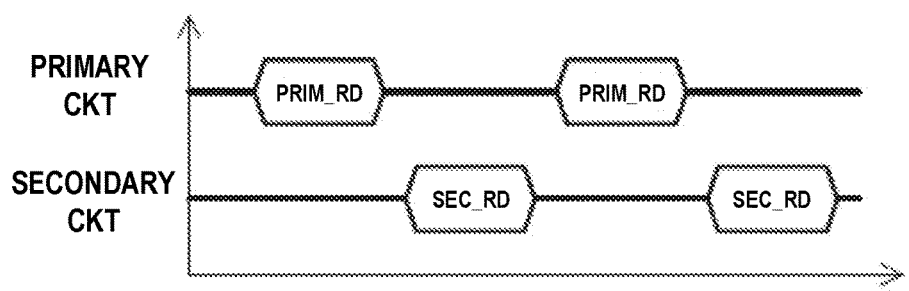

Referring now to FIGS. 14A and 14B, a device 1400 for boosting power according to one aspect of the present embodiments is shown along with its associated timing diagram. Device 1400 may include a primary boost circuit 1416-0, a secondary supply 1414, and a secondary boost circuit 1416-1, and may operate similar to those described above.

In some embodiments, the primary and the second boost circuits 1416-0/1 share a common feedback circuit 1472. In the embodiment the feedback circuit 1472 includes a feedback resistor R14 and an analog to digital converter (ADC) 1474. The primary and the secondary boost circuits 1416-0/1 may be regulated, e.g., output voltage may be regulated, based on value provided from the feedback circuit 1472.

It is appreciated that in some embodiments, the feedback values from the feedback circuit 1472 may be sampled by the boost circuits 1416-0/1 180 degrees out of phase with respect to one another.

Figure 15A:
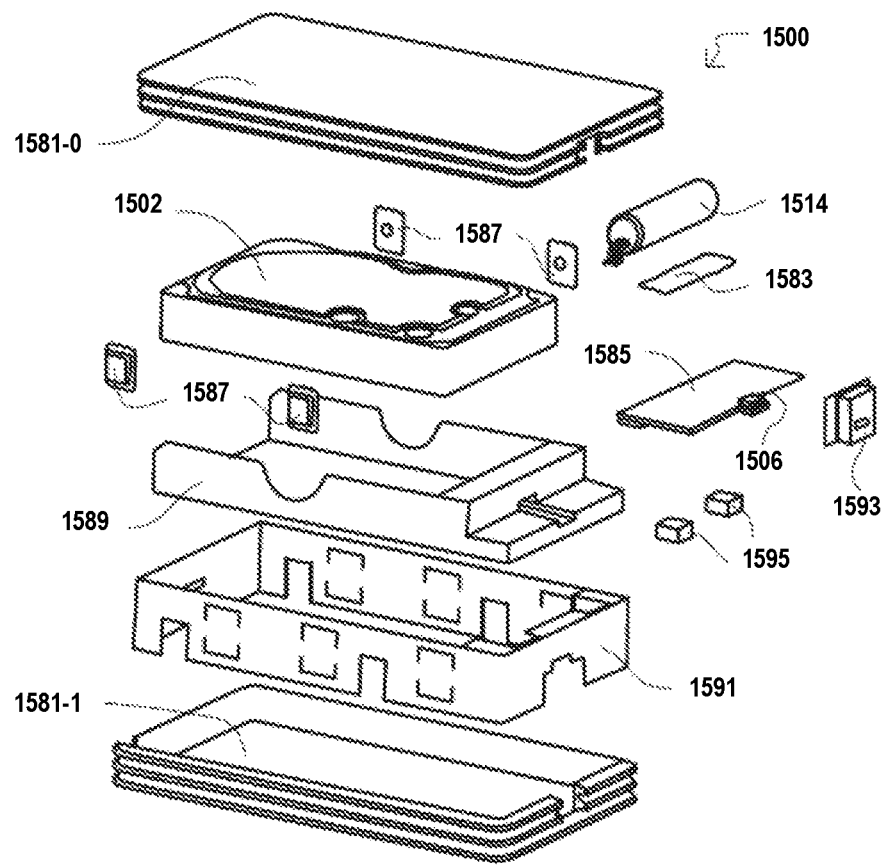
FIGS. 15A and 15B show a device according to one aspect of the present embodiments.
Figure 15B:
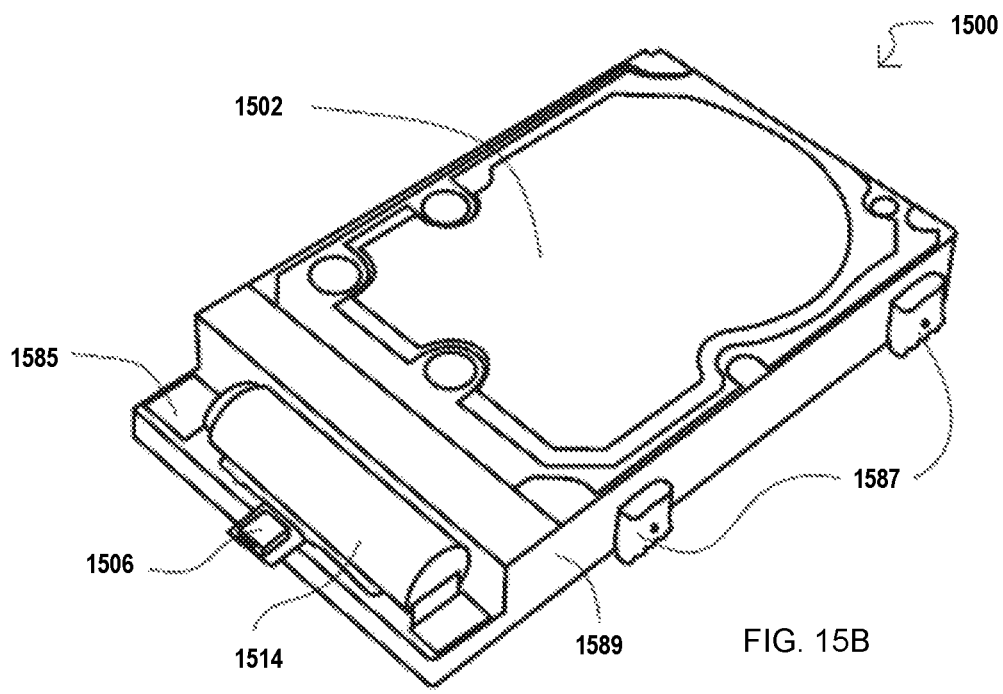

Referring now to FIGS. 15A and 15B, a device 1500 according to one aspect of the present embodiments is shown. Device 1500 may be a portable HDD storage device that receives power from a single type-C USB connection.

In some embodiments, the device 1500 can be a variation of the implementation of either of devices shown in FIGS. 9 and 10.

FIG. 15A is an exploded view of device 1500, and shows a top cover 1581-0, a secondary supply (e.g., battery) 1514, a pad 1583, data storage circuits 1502 (e.g., 3.5" HDD), absorbers 1587, a circuit board assembly 1585, a physical port assembly 1593, thermal pads 1595, EMI shielding assembly 1589, frame 1591, and a bottom cover 1581-1. A circuit board assembly 1585 can include any of, controller sections, power supply sections or bridge sections as described herein, or equivalents. The circuit board assembly 1585 can also include a host communication I/F port 1506 (e.g., USB-type C port).

FIG. 15B is a partially assembled view of device 1500. Like items are referred to by the same reference character as FIG. 15A.

What is claimed is:

1. An apparatus comprising:
   a communication interface configured to receive power from an external host to the apparatus;
   a controller configured to limit a current drawn by the communication interface to a predetermined value when the apparatus is powered through the external host;
   a primary boost circuit configured to generate a first boost voltage from a portion of the limited current drawn by the communication interface, the first boost voltage powering a data storage circuitry;
   a charge reservoir configured to store electrical charges received from another portion of the limited current drawn by the communication interface; and
   a secondary boost circuit configured to generate a second boost voltage from the stored electrical charges of the charge reservoir in response to a signal from the controller, the second boost voltage supplements the first boost voltage during a high power event by the data storage circuitry.

2. The apparatus of claim 1, power needs of the data storage during the high power event exceeds the power received from the external host.

3. The apparatus of claim 1, the first boost voltage is greater than a voltage associated with the received power from the external host.

4. The apparatus of claim 1 further comprising:
   the data storage circuitry comprising storage media configured to store data.

5. The apparatus of claim 4, the storage media is selected from a group consisting of a solid state drive and a hard disk drive.

6. The apparatus of claim 1 further comprising:
   a bridge section configured to provide a control and a data path between the communication interface and the data storage circuit.

7. The apparatus of claim 6, the bridge section is further configured to translate between different communications protocols associated with the data storage circuit and the external host.

8. The apparatus of claim 7, a communication protocol for the external host is a universal serial bus (USB) protocol and a communication protocol for the data storage circuit is serial AT attachment (SATA) protocol.

9. The apparatus of claim 1, the communication interface is a type C universal serial bus (USB) interface.

10. The apparatus of claim 1, the charge reservoir is selected from a group consisting of a battery and a capacitor.

11. The apparatus of claim 1, the external host is a sole external power provider to the apparatus.

12. An apparatus comprising:
    a communication interface configured to receive power from an external host to the apparatus;
    a controller configured to limit a current drawn by the communication interface to a predetermined value when the apparatus is powered through the external host; and
    a power section configured to generate a first voltage from a portion of the limited current drawn by the communication interface, the first voltage powering a data storage circuitry, the power section further configured to store electrical charges received from another portion of the limited current drawn by the communication interface, the power section further configured to generate a second voltage from the stored electrical charges in response to a signal from the controller, the second voltage supplements the first voltage during high power events by the data storage circuitry.

13. The apparatus of claim 12, power needs of the data storage during the high power events exceeds the power received from the external host.

14. The apparatus of claim 12, the controller configured to generate a busy signal in response to determining that electrical charges stored has fallen to a threshold value.

15. The apparatus of claim 14, the controller configured to replenish electrical charges by diverting power received from the communication interface away from the data storage circuitry during the time that busy signal is in effect.

16. The apparatus of claim 15, the controller configured to resume with operations of the storage circuitry by removing the busy signal, in response to the electrical charges stored reaching a certain limit.

17. The apparatus of claim 12, the controller configured to buffering requests response to determining that electrical charges stored has fallen to a threshold value.

18. An apparatus comprising:
    a communication interface configured to receive power from an external host to the apparatus;
    a controller configured to limit a current drawn by the communication interface to a predetermined value when the apparatus is powered through the external host;
    a data storage circuitry comprising storage media configured to store data; and
    a power section comprising:
        a power boost section configured to generate a first voltage from a portion of the limited current drawn by the communication interface, the first voltage powering the data storage circuitry, and the first voltage is greater than a voltage associated with the power received from the external host; and
        a charge reservoir configured to store electrical charges received from another portion of the limited current drawn by the communication interface,
        the power boost section is further configured to generate a second voltage from the stored electrical charges of the charge reservoir in response to a signal from the controller, the second voltage supplements the first voltage during high power events by the data storage circuitry, the controller is configured to halt charging the charge reservoir during high power events and during a time which the second voltage is generated, power needs of the data storage circuitry exceeds the power received from the external host the high power events.

19. The apparatus of claim 18, the controller is configured to generate a busy signal or buffer requests in response to determining that electrical charges stored in the charge reservoir has fallen to a threshold value, the controller is further configured to replenish electrical charges of the charge reservoir when the charges stored in the charge reservoir has fallen to the threshold value by diverting power received from the communication interface away from the data storage circuitry, and the controller is further configured to resume with operations of the storage circuitry by in response to the electrical charges stored reaching a certain limit.

20. The apparatus of claim 18 further comprising:
a bridge section configured to provide a control and a data path between the communication interface and the data storage circuit, the bridge section is further configured to translate between different communications protocols associated with the data storage circuit and the external host.

\* \* \* \* \*